(12) United States Patent
Fawcett et al.

(10) Patent No.: US 8,495,592 B2
(45) Date of Patent: Jul. 23, 2013

(54) PRESENTING COMPLETION PROGRESS STATUS OF AN INSTALLER VIA JOIN POINTS

(75) Inventors: Bradley W. Fawcett, Byron, MN (US); Vincent Edmund Price, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 1751 days.

(21) Appl. No.: 11/563,750

(22) Filed: Nov. 28, 2006

(65) Prior Publication Data

US 2008/0126974 A1    May 29, 2008

(51) Int. Cl.
  *G06F 9/44* (2006.01)
  *G06F 9/45* (2006.01)
  *G06F 9/445* (2006.01)

(52) U.S. Cl.
  USPC ............ 717/130; 717/124; 717/158; 717/174

(58) Field of Classification Search
  None
  See application file for complete search history.

(56) References Cited

U.S. PATENT DOCUMENTS

| | | | |
|---|---|---|---|
| 6,275,987 B1 * | 8/2001 | Fraley et al. | 717/127 |
| 6,530,031 B1 * | 3/2003 | Randall et al. | 714/36 |
| 6,633,899 B1 | 10/2003 | Coward | |
| 6,639,687 B1 | 10/2003 | Neilsen | |
| 6,865,717 B2 | 3/2005 | Wright | |
| 6,927,770 B2 | 8/2005 | Ording | |
| 6,934,916 B1 | 8/2005 | Webb et al. | |
| 6,941,522 B2 * | 9/2005 | Brown | 715/772 |
| 7,793,277 B2 * | 9/2010 | Schmidt | 717/158 |
| 8,032,867 B2 * | 10/2011 | Bansal | 717/127 |
| 8,046,760 B2 * | 10/2011 | Seidman et al. | 717/130 |
| 2002/0049963 A1 * | 4/2002 | Beck et al. | 717/130 |
| 2002/0129352 A1 * | 9/2002 | Brodersen et al. | 717/174 |
| 2002/0174415 A1 * | 11/2002 | Hines | 717/127 |
| 2003/0051234 A1 * | 3/2003 | Schmidt | 717/158 |
| 2003/0074650 A1 * | 4/2003 | Akgul et al. | 717/130 |
| 2003/0088854 A1 * | 5/2003 | Wygodny et al. | 717/130 |
| 2004/0003131 A1 | 1/2004 | Curtis | |
| 2004/0088691 A1 * | 5/2004 | Hammes et al. | 717/158 |

(Continued)

OTHER PUBLICATIONS

Michihiro Horie et al.; Distributed Dynamic Weaving is a Crosscutting Concern; Mar. 2011; retrieved online on Mar. 7, 2013; pp. 1353-1360; Retrieved from the Internet: <URL: http://delivery.acm.org/10.1145/1990000/1982479/p1353-horie.pdf?>.*

(Continued)

*Primary Examiner* — Thuy Dao
*Assistant Examiner* — Hanh T Bui
(74) *Attorney, Agent, or Firm* — Owen J. Gamon

(57) ABSTRACT

In an embodiment, a test installer is executed that includes woven advice located at join points. The join points are associated with methods in the test installer. When the advice in the test installer is executed, the advice saves identifiers of the associated join points and times of execution. Subsets of the join points are assigned to installation options. Each installation option causes a production installer to execute a combination of methods. In response to receiving an installation option, advice is woven into the production installer at the join points specified by the assigned subset. When the advice in the production installer is executed, the advice reports its join point identifier, and the production installer presents completion progress status based on the time that was saved for the join point identifier during execution of the test installer. In this way, progress status may be provided during the installation of programs.

19 Claims, 15 Drawing Sheets

U.S. PATENT DOCUMENTS

| | | | |
|---|---|---|---|
| 2004/0093589 A1* | 5/2004 | Master | 717/130 |
| 2004/0268317 A1* | 12/2004 | Gouriou et al. | 717/130 |
| 2005/0028146 A1* | 2/2005 | Quick | 717/130 |
| 2005/0102667 A1 | 5/2005 | Barta et al. | |
| 2005/0207358 A1* | 9/2005 | Nishida et al. | 370/261 |
| 2005/0289235 A1 | 12/2005 | Suematsu et al. | |
| 2006/0010345 A1 | 1/2006 | Schnoebelen et al. | |
| 2006/0070036 A1* | 3/2006 | Cox et al. | 717/124 |
| 2006/0075079 A1 | 4/2006 | Powers et al. | |
| 2006/0242636 A1* | 10/2006 | Chilimbi et al. | 717/158 |
| 2006/0265707 A1* | 11/2006 | Hayes et al. | 717/174 |
| 2007/0168976 A1* | 7/2007 | Klein | 717/124 |
| 2009/0055802 A1* | 2/2009 | Crosby | 717/127 |
| 2009/0204948 A1* | 8/2009 | Krauss | 717/127 |
| 2009/0265691 A1* | 10/2009 | Varadarajulu | 717/127 |
| 2010/0064279 A1* | 3/2010 | Stewart | 717/124 |

OTHER PUBLICATIONS

Alexandre Duarte et al.; Multi-Environment Software Testing on the Grid; Jul. 17, 2006; retrieved online on Mar. 7, 2013; pp. 61-68; Retrieved from the Internet: <URL: http://delivery.acm.org/10.1145/1150000/1147415/p61-duarte.pdf?>.*

Albuquerque et al.; Maintenance-Automation Engineer: Realistic Considerations for a New Curricula; 2006; retrieved onlin on Mar. 7, 2013; pp. 89-93; Retrieved from the Internet: <URL: http://ieeexplore.ieee.org/stamp/stamp.jsp?tp=&arnumber=4279824>.*

* cited by examiner

TEST POINT CUT STATUS FOR STANDARD INSTALL 152-2

| JOIN POINT ID 712 | TIME STAMP 714 | |
|---|---|---|
| METHOD A, CLASS F | 9:05 | 722 |
| METHOD C, CLASS H | 9:10 | 724 |
| METHOD C, CLASS H | 9:20 | 726 |
| METHOD E, CLASS J | 9:30 | 728 |
| METHOD C, CLASS H | 9:45 | 730 |
| METHOD D, CLASS I | 10:10 | 732 |

FIG. 7B

TEST POINT CUT STATUS FOR DELUXE INSTALL 152-3

| JOIN POINT ID 712 | TIME STAMP 714 | |
|---|---|---|
| METHOD A, CLASS F | 10:23 | 740 |
| METHOD C, CLASS H | 10:24 | 742 |
| METHOD C, CLASS H | 10:32 | 744 |
| METHOD B, CLASS G | 10:38 | 746 |
| METHOD C, CLASS H | 10:54 | 748 |
| METHOD E, CLASS J | 10:55 | 750 |
| METHOD D, CLASS I | 10:59 | 752 |

FIG. 7C

MINIMUM PROFILE 156-1

METHOD/CLASS PROFILE 801-1

METHOD A, CLASS F
METHOD C, CLASS H
METHOD E, CLASS J

PRODUCTION POINT CUT STATUS 802-1

| JOIN POINT ID | SEQUENCE NUMBER | ELAPSED TIME | COMPLETION PROGRESS | |
|---|---|---|---|---|
| METHOD A, CLASS F | 1 | :05 | 8% | 804 |
| METHOD C, CLASS H | 1 | :10 | 17% | 806 |
| METHOD C, CLASS H | 2 | :20 | 33% | 808 |
| METHOD E, CLASS J | 1 | :30 | 50% | 810 |
| METHOD C, CLASS H | 3 | :45 | 75% | 812 |

STANDARD PROFILE     <u>156-2</u>

METHOD/CLASS PROFILE     <u>801-2</u>

METHOD A, CLASS F
METHOD C, CLASS H
METHOD D, CLASS I
METHOD E, CLASS J

PRODUCTION POINT CUT STATUS     <u>802-2</u>

| JOIN POINT ID (814) | SEQUENCE NUMBER (816) | ELAPSED TIME (818) | COMPLETION PROGRESS (820) | |
|---|---|---|---|---|
| METHOD A, CLASS F | 1 | :05 | 7% | 830 |
| METHOD C, CLASS H | 1 | :10 | 13% | 832 |
| METHOD C, CLASS H | 2 | :20 | 27% | 834 |
| METHOD E, CLASS J | 1 | :30 | 40% | 836 |
| METHOD C, CLASS H | 3 | :45 | 60% | 838 |
| METHOD D, CLASS I | 1 | :70 | 93% | 840 |

FIG. 8B

DELUXE PROFILE 156-3

METHOD/CLASS PROFILE 801-3
METHOD A, CLASS F
METHOD B, CLASS G
METHOD C, CLASS H
METHOD D, CLASS I
METHOD E, CLASS J

PRODUCTION POINT CUT STATUS 802-3

| JOIN POINT ID (814) | SEQUENCE NUMBER (816) | ELAPSED TIME (818) | COMPLETION PROGRESS (820) | |
|---|---|---|---|---|
| METHOD A, CLASS F | 1 | :05 | 6% | 850 |
| METHOD C, CLASS H | 1 | :10 | 13% | 852 |
| METHOD C, CLASS H | 2 | :20 | 25% | 854 |
| METHOD B, CLASS G | 1 | :35 | 44% | 856 |
| METHOD C, CLASS H | 3 | :45 | 56% | 858 |
| METHOD E, CLASS J | 1 | 1:00 | 75% | 860 |
| METHOD D, CLASS I | 1 | 1:15 | 94% | 862 |

FIG. 8C

PRODUCTION INSTALL ASPECT 258

POINT CUT: 905

910 BEFORE

ADVICE 915
SEND CLASS NAME, METHOD NAME TO INSTALL STATUS METHOD

FIG. 9

PRESENTING COMPLETION PROGRESS STATUS OF AN INSTALLER VIA JOIN POINTS

FIELD

An embodiment of the invention generally relates to computer systems and more specifically relates to presenting the progress status of an install process via join points using aspect oriented programming.

BACKGROUND

Computer systems typically include a combination of hardware, such as semiconductors and circuit boards, and software, also known as computer programs. Because computer programs are often large, installing them can be a lengthy process that consumes the vast majority of the computer's processing power. Customers naturally wonder whether the installation process is proceeding successfully. Since uncertainty produces anxiety, displaying status as the installation process progresses is an important technique for providing a better experience to customers. An accurate status bar that shows steady progress toward completion gives customers a comfortable feeling because they can see that the install is making progress and they can estimate how much time remains until completion.

A problem that complicates providing accurate installation status is that today's software often includes a variety of sub-programs that originated from a variety of sources, even if the sub-programs are all being installed together as one package. For example, the sub-programs may be written by the customer, provided by the manufacturer of the computer hardware, or provided by third parties. Also these sub-programs may be general purpose programs that customers execute unaltered or specialized sub-programs that are customized for the customers' particular application. When a software solution includes multiple sub-programs, often a single integration program is responsible for coordinating the installation of all of the sub-programs, but this integration program only has status information available when it has control. Once the integration program passes control to the sub-programs, which install themselves, the integration program has no ability to obtain status. Further, since the sub-programs originate from a variety of sources, they do not necessarily provide status regarding the progress they are making. To make matters worse, most installation time is used by the sub-programs and very little time is used executing the integration program. Thus, most of the installation process occurs with the integration program receiving little status information.

One technique for handling the aforementioned problems is to estimate, before the install process starts, the time that the installations of the various sub-programs are likely to need and then update a status bar with the current elapsed time as a percentage of the estimated time, as the current time progresses during the actual installation. This estimation technique works well, so long as the installation encounters no problems and the estimated installation time is near the actual installation time. But, if the installation takes longer than expected, then the customer receives inaccurate status information. Even worse, if the installation hangs, the status bar still indicates that the installation is proceeding normally.

Thus, a better technique is needed for providing status information during installation of software programs.

SUMMARY

A method, apparatus, system, and signal-bearing medium are provided. In an embodiment, a test installer is executed that includes woven advice located at join points. The join points are associated with methods in the test installer. When the advice in the test installer is executed, the advice saves identifiers of the associated join points and the times of execution. Subsets of the join points are assigned to installation options. Each installation option causes a production installer to execute a different combination of methods. In response to receiving one of the installation option, advice is woven into the production installer at the join points specified by the subset assigned to the received installation option. When the advice in the production installer is executed, the advice reports its associated join point identifier, and the production installer presents completion progress status for its execution based on the time that was saved for the join point identifier during the execution of the test installer. In this way, progress status may be provided during the installation of programs.

BRIEF DESCRIPTION OF THE DRAWINGS

Various embodiments of the present invention are hereinafter described in conjunction with the appended drawings:

FIG. 7B depicts a block diagram of an example data structure for test point cut status for a standard install, according to an embodiment of the invention.

FIG. 7C depicts a block diagram of an example data structure for test point cut status for a deluxe install, according to an embodiment of the invention.

FIG. 8A depicts a block diagram of an example data structure for a minimum profile, according to an embodiment of the invention.

FIG. 8B depicts a block diagram of an example data structure for a standard profile, according to an embodiment of the invention.

FIG. 8C depicts a block diagram of an example data structure for a deluxe profile, according to an embodiment of the invention.

FIG. 9 depicts a block diagram of an example data structure for a production install aspect, according to an embodiment of the invention.

It is to be noted, however, that the appended drawings illustrate only example embodiments of the invention, and are therefore not considered limiting of its scope, for the invention may admit to other equally effective embodiments.

DETAILED DESCRIPTION

In an embodiment of the invention, a weaver weaves advice to join points in a test installer. The join points are associated with methods in the test installer and define the locations that the advice executes within the test installer. The advice includes code fragments or methods. When the advice in the test installer is executed, the advice saves identifiers of the associated join points and the times of its execution. Subsets of the join points are selected and assigned to installation options. Each installation option causes a production installer to execute a different combination of methods within the production installer. In response to receiving an installation option, a weaver weaves advice to a production installer at the join points that are specified by the subset assigned to the installation option. When the advice in the production installer is executed, the advice reports its join point identifier to a status method in the production installer, and the status method presents completion progress status based on the time that was saved for the join point identifier during execution of the test installer.

Figure 1:
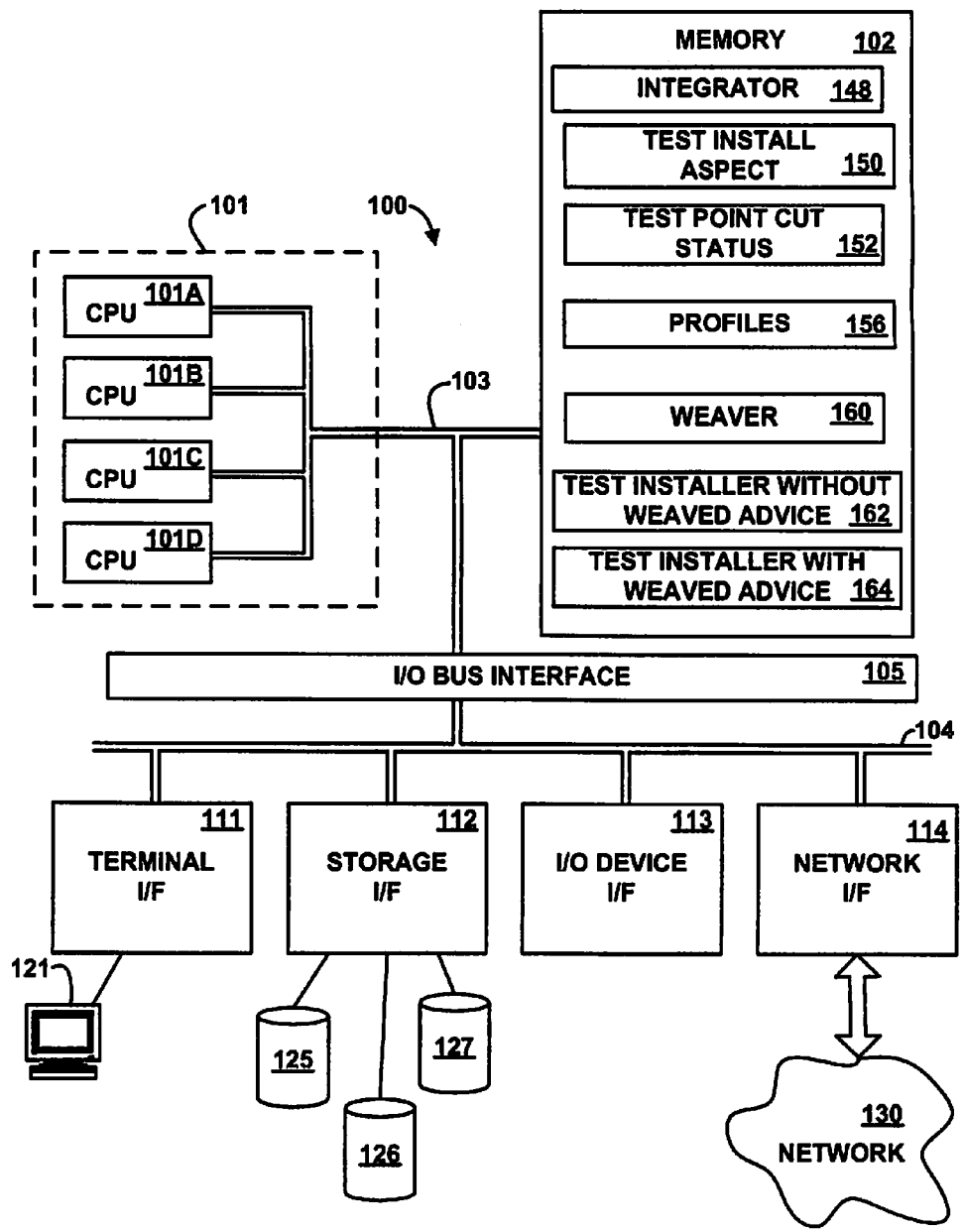
FIG. 1 depicts a high-level block diagram of an example system for implementing an embodiment of the invention.

Referring to the Drawings, wherein like numbers denote like parts throughout the several views, FIG. 1 depicts a high-level block diagram representation of a computer system 100 connected to a network 130, according to an embodiment of the present invention. In an embodiment, the hardware components of the computer system 100 may be implemented by an eServer iSeries computer system available from International Business Machines Corporation of Armonk, N.Y. However, those skilled in the art will appreciate that the mechanisms and apparatus of embodiments of the present invention apply equally to any appropriate computing system.

The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing or encoding data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes an integrator 148, a test install aspect 150, test point cut status 152, profiles 156, a weaver 160, a test installer (without weaved advice) 162, and a test installer (with weaved advice) 164. Although the integrator 148, the test install aspect 150, the test point cut status 152, the profiles 156, the weaver 160, the test installer (without weaved advice) 162, and the test installer (with weaved advice) 164 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the integrator 148, the test install aspect 150, the test point cut status 152, the profiles 156, the weaver 160, the test installer (without weaved advice) 162, and the test installer (with weaved advice) 164 are illustrated as being contained within the main memory 102, these elements are not necessarily all completely contained in the same storage device at the same time. Further, although the integrator 148, the test install aspect 150, the test point cut status 152, the profiles 156, the weaver 160, the test installer (without weaved advice) 162, and the test installer (with weaved advice) 164 are illustrated as being separate entities, in other embodiments some of them, portions of some of them, or all of them may be packaged together.

The test install aspect 150 defines advice and join points. The weaver 160 weaves the advice into the test installer (creating the test installer 164) at the join points. Although the test installers 162 and 164 are illustrated as being separate within the memory 102, in another embodiment they may represent different contents of the same file or object at different times. The advice, when executed as part of execution of the test installer (with weaved advice) 164, writes information to the test point cut status 152. The integrator 148 controls the execution of the test installer (with weaved advice) 164 and creates the profiles 156 based on the test point cut status 152. The profiles 156 specify different combinations of methods in the test installer that correspond to different installation options.

In an embodiment, the weaver 160 may be a source-level weaver that weaves the advice into the source code of the test installer. In another embodiment, the weaver 160 may be a byte-code weaver that weaves the advice during a build process or during class loading of the test installer. The test installer installs programs (e.g., software, code, methods, and/or data) to the computer system 100. The programs that the test installer 164 installs to the computer system 100 may be a part of the test installer 164 or may be external to the test installer.

The weaver 160 and the test installer 164 include instructions capable of executing on the processor 101 or statements capable of being interpreted by instructions executing on the processor 101 to perform the functions as further described below with reference to FIGS. 11 and 12.

An example of a user interface (displayed on the terminal 121) that allows a user to input an installation option is further described below with reference to FIG. 3. An example of the test installer (without weaved advice) 162 is further described below with reference to FIG. 4. An example of the test install aspect 150 is further described below with reference to FIG. 5. An example of the test installer (with weaved advice) 164 is further described below with reference to FIG. 6. Examples of the test point cut status 152 are further described below with reference to FIGS. 7A, 7B, and 7C. Examples of the profiles 156 customized for different installation options are further described below with reference to FIGS. 8A, 8B, and 8C.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI (Peripheral Component Interface) bus, or any other appropriate bus technology.

The I/O interface units support communication with a variety of storage and I/O devices. For example, the terminal interface unit 111 supports the attachment of one or more user terminals 121. The user terminal 121 may include a keyboard, video display terminal, speakers, a mouse or other pointing device, or any other input and/or output device via which a user can submit input and/or receive output to and/or from the computer system 100. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127, as needed.

The I/O device interface 113 provides an interface to any of various other input/output devices or devices of other types, such as printers, fax machines, or any other devices. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 may be a multi-user "mainframe" computer system, a single-user system, or a server or similar device that has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support the Infiniband architecture. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present.

Figure 2:
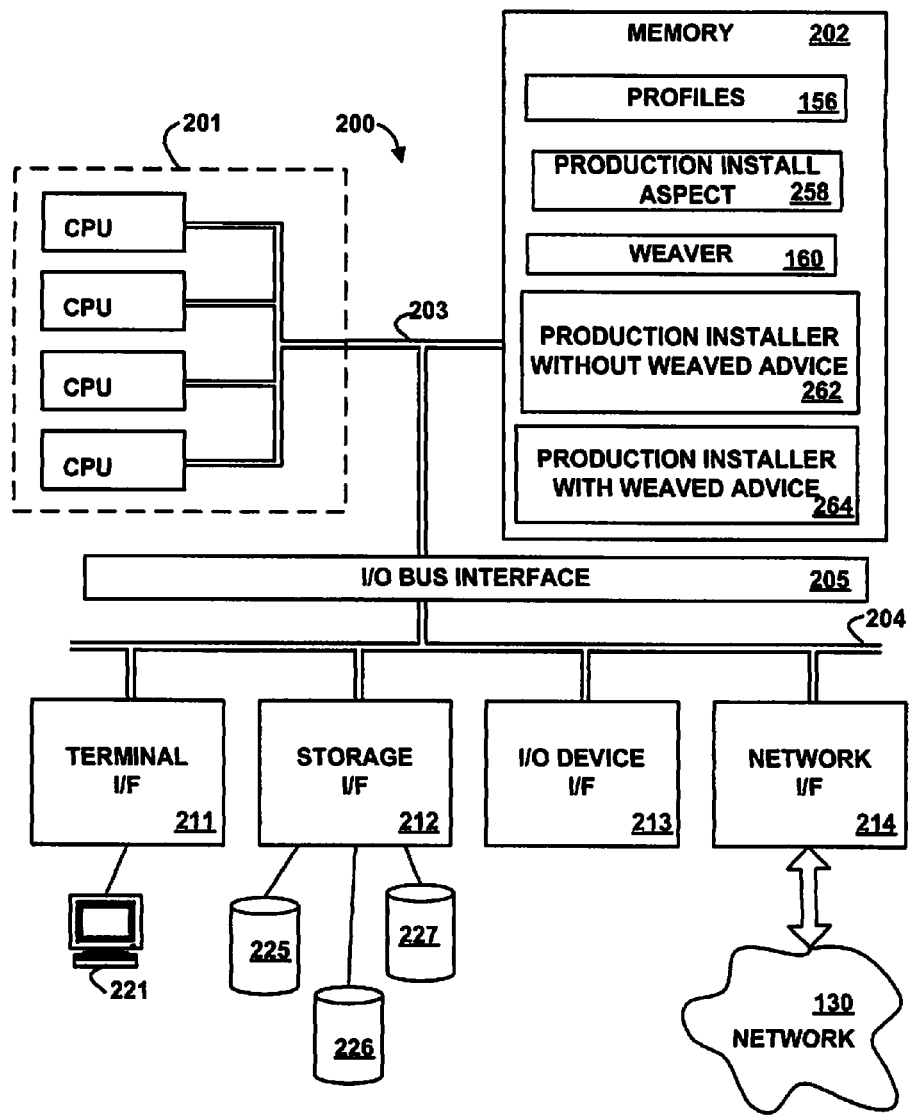
FIG. 2 depicts a high-level block diagram of another example system for implementing an embodiment of the invention.

FIG. 2 depicts a high-level block diagram of an example computer system 200 for implementing an embodiment of the invention. In an embodiment, the hardware components of the computer system 200 may be implemented by an eServer iSeries computer system available from International Business Machines Corporation of Armonk, N.Y. However, those skilled in the art will appreciate that the mechanisms and apparatus of embodiments of the present invention apply equally to any appropriate computing system. In various embodiments the computer system 200 may be the same or a different computer system from the computer system 100 (FIG. 1).

The major components of the computer system 200 include one or more processors 201, a main memory 202, a terminal interface 211, a storage interface 212, an I/O (Input/Output) device interface 213, and communications/network interfaces 214, all of which are coupled for inter-component communication via a memory bus 203, an I/O bus 204, and an I/O bus interface unit 205.

The computer system 200 contains one or more general-purpose programmable central processing units (CPUs) 201. In an embodiment, the computer system 200 contains multiple processors typical of a relatively large system; however, in another embodiment the computer system 200 may alternatively be a single CPU system. Each processor 201 executes instructions stored in the main memory 202 and may include one or more levels of on-board cache.

The main memory 202 is a random-access semiconductor memory for storing or encoding data and programs. In another embodiment, the main memory 202 represents the entire virtual memory of the computer system 200, and may also include the virtual memory of other computer systems coupled to the computer system 200 or connected via the network 130.

The main memory 202 stores or encodes profiles 156, a production install aspect 258, a weaver 160, a production installer (without weaved advice) 262, and a production installer (with weaved advice) 264. Although the profiles 156, the production install aspect 258, the weaver 160, the production installer (without weaved advice) 262, and the production installer (with weaved advice) 264 are illustrated as being contained within the memory 202 in the computer system 200, in other embodiments some or all of them may be on different computer systems and may be accessed remotely, e.g., via the network 130. The computer system 200 may use virtual addressing mechanisms that allow the programs of the computer system 200 to behave as if they only have access to a large, single storage entity instead of access to multiple, smaller storage entities. Thus, while the profiles 156, the production install aspect 258, the weaver 160, the production installer (without weaved advice) 262, and the production installer (with weaved advice) 264 are illustrated as being contained within the main memory 202, these elements are not necessarily all completely contained in the same storage device at the same time. Further, although the profiles 156, the production install aspect 258, the weaver 160, the production installer (without weaved advice) 262, and the production installer (with weaved advice) 264 are illustrated as being separate entities, in other embodiments some of them, portions of some of them, or all of them may be packaged together.

The profiles 156 are loaded into the computer system 200 after being created by the computer system 100, as previously described above. The profiles 156 specify different combinations of methods in the production installer 262 and 264 that correspond to different installation options. These different combinations of methods define different combinations of join points within the production installer 262 and 264. The production install aspect 258 defines advice. The weaver 160 weaves the advice into the production installer at the join points. The advice, when executed as part of execution of the production installer (with weaved advice) 264, sends messages to an install status method in the production installer, which presents status as to the progress of the install that the production installer 264 performs.

In an embodiment, the weaver 160 may be a source-level weaver that weaves the advice into the source code of the production installer 264. In another embodiment, the weaver 160 may be a byte-code weaver that weaves the advice during a build process or during class loading of the production installer 264. The production installer 264 installs programs (e.g., software, code, methods, and/or data) to the computer system 200. The programs that the production installer installs 264 to the computer system 200 may be a part of the production installer 264 or may be external to the production installer 264. In an embodiment, the production installer 262 is identical to the test installer 162. Although the production installers 262 and 264 are illustrated as being separate within the memory 202, in another embodiment they may represent different contents of the same file or object at different times.

The weaver 160 and the production installer 264 include instructions capable of executing on the processor 201 or statements capable of being interpreted by instructions executing on the processor 201 to perform the functions as further described below with reference to FIGS. 12 and 13.

An example of a user interface (displayed on the terminal 221) that allows a user to input an installation option is further described below with reference to FIG. 3. An example of the production installer (without weaved advice) 262 is further described below with reference to FIG. 4. Examples of the profiles 156 customized for different installation options are further described below with reference to FIGS. 8A, 8B, and 8C. An example of the production install aspect 258 is further described below with reference to FIG. 9. Examples of the production installer (with weaved advice) 264 created from a variety of profiles 156 are further described below with reference to FIGS. 10A, 10B, and 10C.

The memory bus 203 provides a data communication path for transferring data among the processor 201, the main memory 202, and the I/O bus interface unit 205. The I/O bus interface unit 205 is further coupled to the system I/O bus 204 for transferring data to and from the various I/O units. The I/O bus interface unit 205 communicates with multiple I/O interface units 211, 212, 213, and 214, which are also known as I/O processors (IOPs) or I/O adapters (IOAs), through the system I/O bus 204.

The I/O interface units support communication with a variety of storage and I/O devices. For example, the terminal interface unit 211 supports the attachment of one or more user terminals 121. The user terminal 121 may include a keyboard, video display terminal, speakers, a mouse or other pointing device, or any other input and/or output device via which a user can submit input or receive output to and from the computer system 200. The storage interface unit 212 supports the attachment of one or more direct access storage devices (DASD) 225, 226, and 227 (which are typically rotating magnetic disk drive storage devices, although they could alternatively be other devices, including arrays of disk drives configured to appear as a single large storage device to a host). The contents of the main memory 202 may be stored to and retrieved from the direct access storage devices 225, 226, and 227, as needed.

The network interface 214 provides one or more communications paths from the computer system 200 to other digital devices and computer systems; such paths may include, e.g., one or more networks 130.

In various embodiments, the computer system 200 may be a multi-user "mainframe" computer system, a single-user system, or a server or similar device that has little or no direct user interface, but receives requests from other computer systems (clients). In other embodiments, the computer system 200 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

It should be understood that FIGS. 1 and 2 are intended to depict the representative major components of the computer systems 100 and 200 and the network 130 at a high level, that individual components may have greater complexity than represented in FIGS. 1 and 2, that components other than or in addition to those shown in FIGS. 1 and 2 may be present, and that the number, type, and configuration of such components may vary. Several particular examples of such additional complexity or additional variations are disclosed herein; it being understood that these are by way of example only and are not necessarily the only such variations.

The various software components illustrated in FIGS. 1 and 2 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer systems 100 and/or 200, and that, when read and executed by one or more processors in the computer systems 100 and/or 200, cause the computer systems 100 and/or 200 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 and/or 200 via a variety of tangible signal-bearing media that may be operatively or communicatively connected (directly or indirectly) to the processor or processors, such as the processors 101 and 201. The signal-bearing media may include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125, 126, 127, 225, 226, or 227), the main memory 102 or 202, CD-RW, or diskette; or (3) information conveyed to the computer systems 100 and/or 200 by a communications medium, such as through a computer or a telephone network.

Such tangible signal-bearing media, when encoded with or carrying computer-readable and executable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying computing services (e.g., computer-readable code, hardware, and web services) that implement, some or all of the methods described herein. Aspects of these embodiments may also include analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIGS. 1 and 2 are not intended to limit the present invention. Indeed, other alternative hardware and/or software environments may be used without departing from the scope of the invention.

Figure 3:
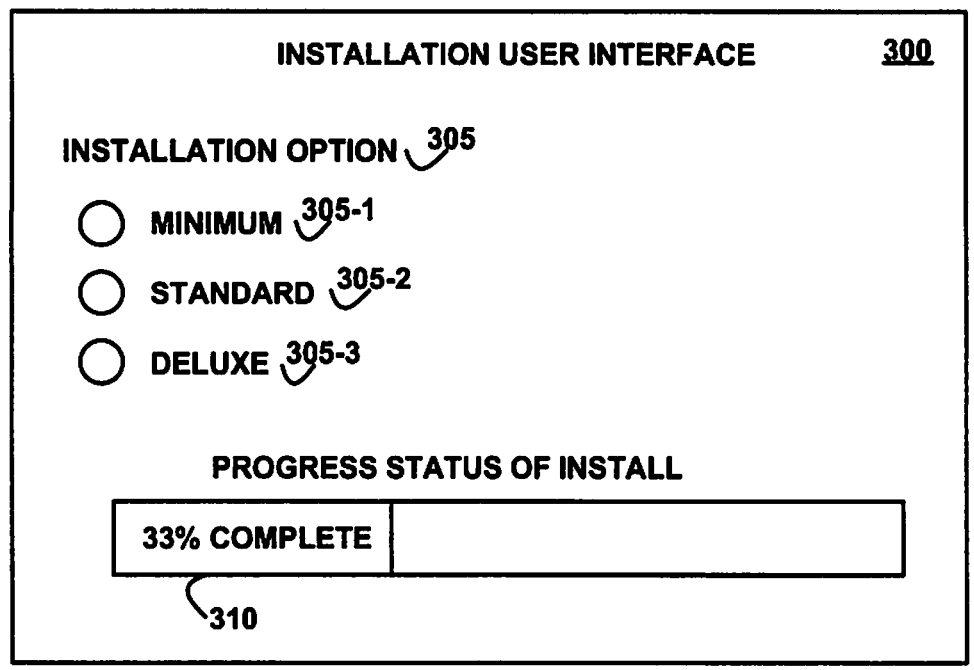
FIG. 3 depicts a block diagram of an example installation user interface, according to an embodiment of the invention.

FIG. 3 depicts a block diagram of an example installation user interface 300, according to an embodiment of the invention. The test installer and/or the production installer present the installation user interface 300 via the terminals 121 or 221. The installation user interface 300 includes an installation option 305 and a progress status icon 310. The installation option 305 allows a user to select between various combinations of subprograms or methods in the test installer or the production installer, e.g., a minimum combination of methods selected by the minimum installation option 305-1, a standard combination of methods selected by the standard installation option 305-2, or a deluxe combination of methods selected by the deluxe installation option 305-3.

In response to receiving a selection of an installation option 305-1, 305-2, or 305-3, the test installer and/or the production installer select and invoke different subsets or combinations of the methods within the test installer and/or the production installer that are assigned to, or associated with, that installation option, in order to execute or install different programs, subprograms, applications, functions, and/or data to the computer systems 100 or 200. The user may select one of the installations option 305-1, 305-2, or 305-3 via a keyboard, mouse or other user input device. The words "minimum," "standard," and "deluxe," are merely used as examples of labels to represent different combinations of methods in the test installer and the production installer.

The test installer or the production installer presents the progress status icon 310, in order to communicate the progress of the installation process. The test installer or production installer updates or modifies the progress install icon 310 at a variety of times during the execution of the methods of the test installer or the production installer, in order to indicate the changing progress of the installation process. In various embodiments, the progress status icon 310 may indicate the amount of time consumed so far by the installation process (as compared to the total amount of estimated time for the complete installation), the amount of time remaining until the installation process is complete, the amount of data or programs installed thus far compared to the total amount of data or number of programs to be installed, the amount of data or programs that remain to be installed, or any combination thereof. In the example of FIG. 3, the progress status icon 310 indicates that the installation process performed by the test installer or the production installer is currently 33% complete.

Figure 4:
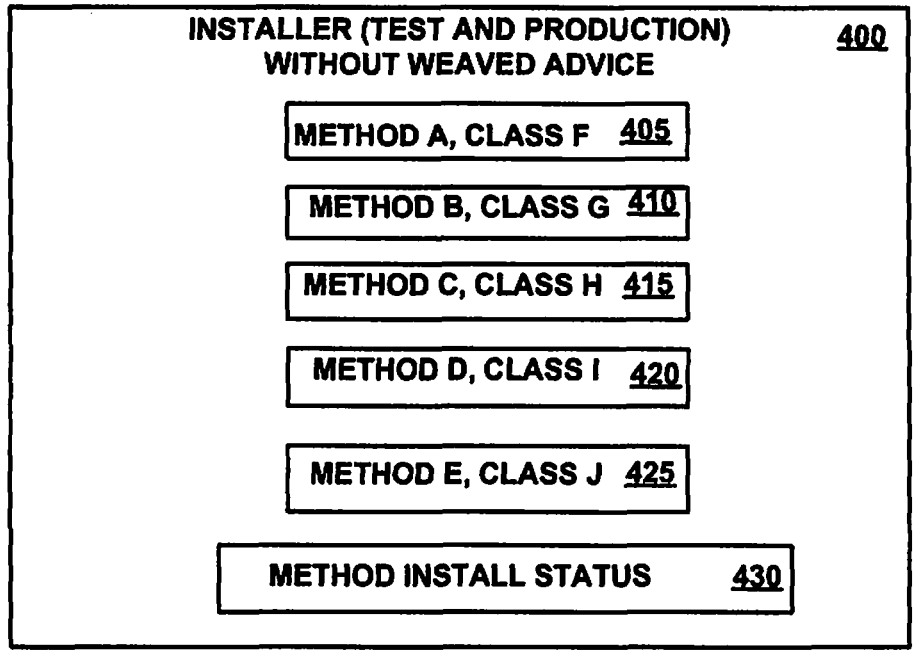
FIG. 4 depicts a block diagram of an example installer without weaved advice, according to an embodiment of the invention.

FIG. 4 depicts a block diagram of an example installer 400 without weaved advice, according to an embodiment of the invention. The installer 400 generically refers to the test installer 162 and/or the production installer 262 before the weaver 160 weaves (copies and inserts) advice into the respective test installer or the production installer. The installer 400 includes example methods 405, 410, 415, 420, 425, and 430. In various embodiments, the methods 405, 410, 415, 420, 425, and 430 may represent classes or instantiated objects of the classes, and the installer 400 may exist as source code, byte codes, object code, executable instructions or interpretable statements. Selection of one of the installation options 305-1, 305-2, or 305-3 (FIG. 3) causes the installer 400 to select different subsets of the methods 405, 410, 415, 420, and 425 for execution.

In various embodiments, the methods 405, 410, 415, 420, and 425 execute on the processor 101 or 201 and install programs or sub-programs to the computer 100 or 200. In an embodiment, some or all of the methods 405, 410, 415, 420, and/or 425 may include the programs or sub-programs that the installer 400 installs to the computers 100 and/or 200. For example, the installer 400 may copy some or all, or a portion of some or all, of the methods 405, 410, 415, 420, and/or 425 to the computer system 100 or 200 as part of the installation process. After such an installation process, some, all or a portion of some or all of the methods 405, 410, 415, 420, and/or 425 are stored in the computer system 100 or 200 separately from the installer 400 and are capable of executing on the processors 101 or 201. In another embodiment, the programs and/or sub-programs methods that the installer 400 installs to the computer system 100 or 200 are separate from the installer 400, and the methods 405, 410, 415, 420, and 425 are the code that performs the installation of the various programs and/or sub-programs.

The method 430 executes on the processor 101 or 201 to present the progress status 310 via the user interface 300 and the terminals 121 or 221.

Figure 5:
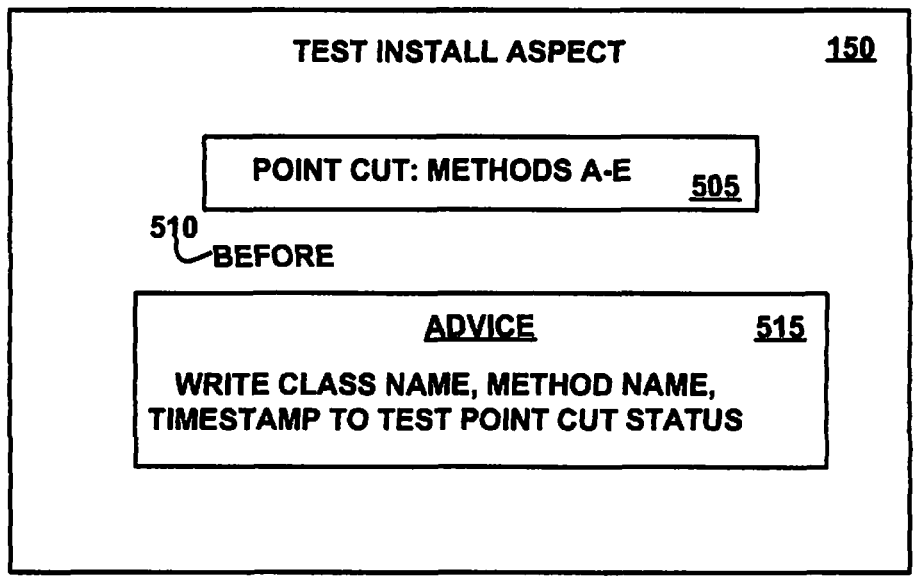
FIG. 5 depicts a block diagram of an example data structure for a test install aspect, according to an embodiment of the invention.

FIG. 5 depicts a block diagram of an example data structure for a test install aspect 150, according to an embodiment of the invention. The test install aspect 150 includes a point cut 505, a before statement 510, and advice 515. The point cut 505 specifies a set of join points in the test installer, which may be a specification of a subset of the methods in the test installer, e.g. the methods 405, 410, 415, 420, and 425 (FIG. 4). When the weaver 160 executes, the weaver 160 inserts (copies or weaves) the advice 515 before (as specified by the "before" statement 510) the methods 405, 410, 415, 420, and 425 into the test installer 164, as further described below with reference to FIG. 6. Although the test install aspect 150 includes a before statement 510, which specifies that the advice 515 is be inserted before the join points specified by the point cut 505, in another embodiment, the test install aspect may include an "after" statement, specifying that the weaver 160 is to weave (copy and insert) the advice 515 after the methods specified by the point cut 505.

In response to the execution of the test installer reaching one of the join points specified in the point cut 505, the advice 515 (a method or code fragment) associated with the join point is executed. This allows the creator of the test install aspect 150 to describe where and when additional code (the advice 515) should be executed in addition to the already defined behavior of the test installer. The test installer, the join points specified by the point cut 505, the before statement 510, and the advice 515 can be developed independently, and the test installer does not need any knowledge of the join points or advice of the test install aspect 150, and the source code for the test installer does not need to be available, in the case where the weaver 160 is a byte code weaver.

Figures 6, 7A:
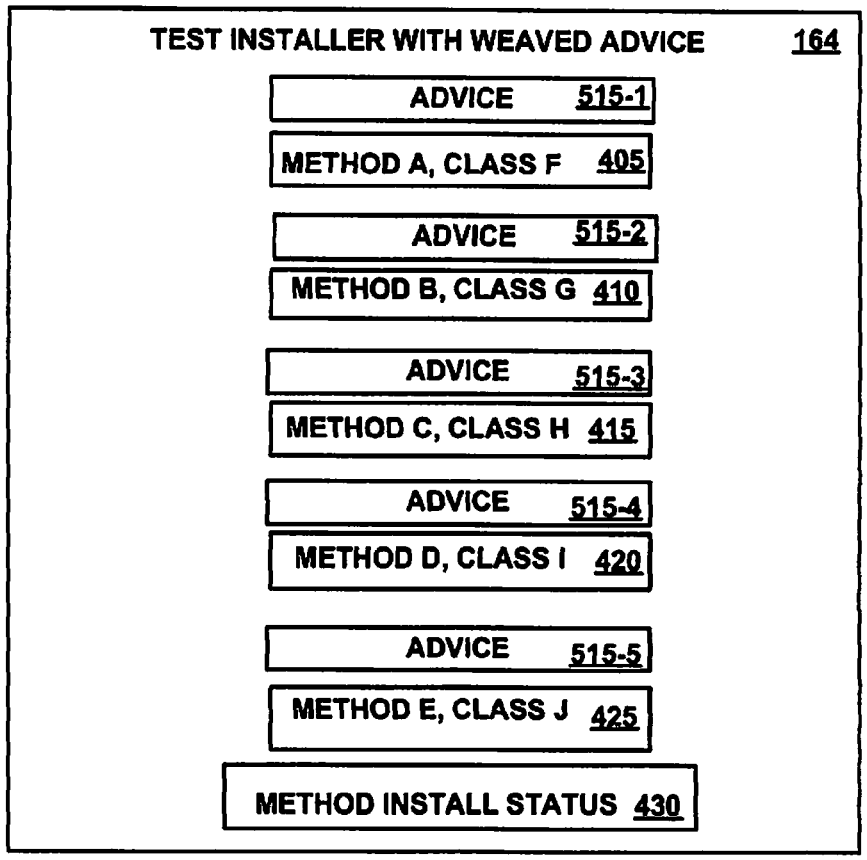
FIG. 6 depicts a block diagram of an example test installer with weaved advice, according to an embodiment of the invention.
FIG. 7A depicts a block diagram of an example data structure for test point cut status for a minimum install, according to an embodiment of the invention.

FIG. 6 depicts a block diagram of an example test installer (with weaved advice) 164, according to an embodiment of the invention. The test installer (with weaved advice) 164 describes the test installer after the weaver 160 has weaved in the advice specified by the test install aspect 150 at the join points in the test installer specified by the point cut 505 and the before statement 510 of the test install aspect 150. Thus, as illustrated in FIG. 6, the weaver 160 has copied and inserted the advice 515-1, 515-2, 515-3, 515-4, and 515-5 (which are all copies of the advice 515 of FIG. 5) at join points within the test installer 164 before the respective methods 405, 410, 415, 420, and 425 because the test install aspect 150 included the before statement 510 and the advice 515, and because the point cut 505 specified the methods 405, 410, 415, 420, and 425. The method install status 430 was not specified by the point cut 505 as a join point, so the weaver 160 did not insert any advice before the method install status 430 in the test installer 164. In response to the execution of the test installer 164 reaching one of the join points specified in the point cut, the respective advice 515-1, 515-2, 515-3, 515-4, or 515-5 is executed, which writes or stores the respective associated class name, respective associated method name, and time of the execution of the respective advice to the test point cut status 152.

For example, when (every time) the advice 515-1 executes on the processor 101, the advice 515-1 writes or stores the method name "method A," the class name "class F," and the date and time that the advice 515-1 executed to a record in the test point cut status 152. When (every time) the advice 515-2 executes on the processor 101, the advice 515-2 writes or stores the method name "method B," the class name "class G," and the date and time that the advice 515-2 executed to a record in the test point cut status 152. When (every time) the advice 515-3 executes on the processor 101, the advice 515-3 writes or stores the method name "method C," the class name "class H," and the date and time that the advice 515-3 executed to a record in the test point cut status 152. When the advice 515-4 executes on the processor 101, the advice 515-4 writes or stores the method name "method D," the class name "class I," and the date and time that the advice 515-4 executed to a record in the test point cut status 152. When the advice 515-5 executes on the processor 101, the advice 515-5 writes or stores the method name "method E," the class name "class J," and the date and time that the advice 515-5 executed to a record in the test point cut status 152.

FIG. 7A depicts a block diagram of example data structure for the test point cut status for a minimum install 152-1, according to an embodiment of the invention. The test point cut status 152-1 is assigned to, or associated with, the minimum installation option 305-1, and is used when the test installer is executed when the minimum installation option 305-1 has been selected. The test point cut status 152 (FIG. 1) generically refers to the test point cut status 152-1.

The test point cut status 152-1 includes example records 702, 704, 706, 708, and 710, each of which includes a join point identifier field 712 and a time stamp field 714. Each of the records 702, 704, 706, 708, and 710 represents an execution of the advice 515 as part of the execution of the test installer.

The join point identifier field 712 identifies a join point location in the test installer at which the advice that created the record executed. The time stamp field 714 identifies the date and/or time that the advice at the join point in the test installer that is identified by the join point identifier 712 executed.

The record 702 was created by the advice 515-1 (FIG. 6), which stored the method name "method A" and the class name "class F" to the join point identifier field 712 and stored the date and time that the advice 515-1 executed (on the processor 101 as part of the test installer 164) to the time stamp 714. The records 704, 706, and 710 were created at different times by different executions of the advice 515-3 (FIG. 6), which stored the method name "method C" and the class name "class H" to the join point identifier field 712 and stored the date and time that the advice 515-3 (FIG. 6) executed (on the processor 101 as part of the test installer 164) to the time stamp field 714. The record 708 was created by the advice 515-5 (FIG. 6), which stored the method name "method E" and the class name "class J" to the join point identifier field 712 and stored the date and time that the advice 515-5 (FIG. 6) executed (on the processor 101 as part of the test installer 164) to the time stamp field 714.

FIG. 7B depicts a block diagram of an example data structure for test point cut status for a standard install 152-2, according to an embodiment of the invention. The test point cut status 152-2 is assigned to, or associated with, the standard installation option 305-2, and is used when the test installer is executed with the standard installation option 305-2. The test point cut status 152 (FIG. 1) generically refers to the test point cut status 152-2.

The test point cut status 152-2 includes example records 722, 724, 726, 728, 730, and 732, each of which includes a join point identifier field 712 and a time stamp field 714. Each of the records 722, 724, 726, 728, 730, and 732 represents an execution of the advice 515 as part of the execution of the test installer.

The join point identifier field 712 identifies a join point location in the test installer 164 at which the advice that created the record executed. The time stamp field 714 specifies the time that the advice at the join point 712 executed in the test installer 164.

The record 722 was created by the advice 515-1 (FIG. 6), which stored the method name "method A" and the class name "class F" to the join point identifier field 712 and stored the date and time that the advice 515-1 executed (on the processor 101 as part of the test installer 164) to the time stamp 714. The records 724, 726, and 730 were created at different times by different executions of the advice 515-3, which stored the method name "method C" and the class name "class H" to the join point identifier field 712 and stored the date and time that the advice 515-3 executed (on the processor 101 as part of the test installer 164) to the time stamp field 714. The record 728 was created by the advice 515-5, which stored the method name "method E" and the class name "class J" to the join point identifier field 712 and stored the date and time that the advice 515-5 executed (on the processor 101 as part of the test installer 164) to the time stamp field 714. The record 732 was created by the advice 515-4, which stored the method name "method D" and the class name "class I" to the join point identifier field 712 and stored the date and time that the advice 515-4 executed (on the processor 101 as part of the test installer 164) to the time stamp field 714.

FIG. 7C depicts a block diagram of an example data structure for test point cut status for a deluxe install 152-3, according to an embodiment of the invention. The test point cut status 152-3 is assigned to, or associated with, the deluxe installation option 305-3, and is used when the test installer is executed when the deluxe installation option 305-3 has been selected. The test point cut status 152 (FIG. 1) generically refers to the test point cut status 152-3.

The test point cut status 152-3 includes example records 740, 742, 744, 746, 748, 750, and 752, each of which includes a join point identifier field 712 and a time stamp field 714. Each of the records 740, 742, 744, 746, 748, 750, and 752 represents an execution of the advice 515 as part of the execution of the test installer 164.

The join point identifier field 712 identifies a join point location in the test installer 164 at which the advice that created the record executed. The time stamp field 714 specifies the date and/or time that the advice at the join point identified in the join point identifier field 712 executed in the test installer 164.

The record 740 was created by the advice 515-1 (FIG. 6), which stored the method name "method A" and the class name "class F" to the join point identifier field 712 and stored the date and time that the advice 515-1 executed on the processor 101 as part of the test installer 164 to the time stamp field 714. The records 742, 744, and 748 were created at different times by different executions of the advice 515-3, which stored the method name "method C" and the class name "class H" to the join point identifier field 712 and stored the date and time that the advice 515-3 executed (on the processor 101 as part of the test installer 164) to the time stamp field 714. The record 746 was created by the advice 515-2, which stored the method name "method B" and the class name "class G" to the join point identifier field 712 and stored the date and time that the advice 515-2 executed (on the processor 101 as part of the test installer 164) to the time stamp field 714. The record 750 was created by the advice 515-5, which stored the method name "method E" and the class name "class J" to the join point identifier field 712 and stored the date and time that the advice 515-5 executed (on the processor 101 as part of the test installer 164) to the time stamp field 714. The record 752 was created by the advice 515-4, which stored the method name "method D" and the class name "class I" to the join point identifier field 712 and stored the date and time that the advice 515-4 executed (on the processor 101 as part of the test installer 164) to the time stamp field 714.

FIG. 8A depicts a block diagram of an example data structure for a minimum profile 156-1, according to an embodiment of the invention. The production installer selects and uses the minimum profile 156-1 in response to selection of the minimum installation option 305-1 (FIG. 3). The minimum profile 156-1 is assigned to, or associated with, the minimum installation option 305-1. The profile 156 (FIG. 1) generically refers to the minimum profile 156-1.

The minimum profile 156-1 includes a method/class profile 801-1 and a production point cut status 802-1. The method/class profile 801-1 includes a specification of a subset of the methods and/or classes in the production installer that is assigned to, or associated with, the minimum installation option 305-1. In response to selection of the minimum installation option 305-1, the production installer executes the subset of its methods that is specified in the method/class profile 801-1. The method/class profile 801-1 further specifies the join points or locations in the production installer where the weaver 160 inserts advice, as further described below with reference to FIGS. 9 and 10A, and these join points specified by the method/class profile 801-1 for the production installer are a subset of the join points in the test installer, e.g., the join points specified by the point cut 505 in the test install aspect 150.

The production point cut status 802-1 includes example records 804, 806, 808, 810, and 812, each of which represents an execution occurrence of the advice at the respective join point identified by the join point identifier 814. Each of the example records 804, 806, 808, 810, and 812 includes a join point identifier field 814, a sequence number field 816, an elapsed time field, and a completion progress field 820. The join point identifier field 814 identifies a join point or location in the test installer at which the advice executed. In an embodiment, the join point identifier field 814 specifies a method and/or class within the test installer.

The sequence number field 816 specifies an order of execution of the advice at the join point 814 with respect to other times that the same advice was executed (with respect to other execution occurrences) at the same join point 814. For example, records 806, 808, and 812 all specify the same join point identifier 814, which is "method C, class H," but each of the records 806, 808, and 812 have different sequence numbers 816, which are 1, 2, and 3, respectively. Thus, the record 806 represents the first time (sequence number 816 of "1") that the advice at the join point 814 of "method C, class H" was executed; the record 808 represents the second time (sequence number 816 of "2") that the advice at the join point 814 of "method C, class H" was executed; and the record 812 represents the third time (sequence number 816 of "3") that the advice at the join point 814 of "method C, class H" was executed. The records 804 and 810 both have sequence numbers 816 of "1" because the advice at the join point identifier 814 "method A, class F" and the join point identifier 814 "method E, class J" were only executed one time.

The elapsed time field 818 stores the elapsed time (since the beginning of the execution of the test installer) at which the advice at the respective join point identifier 814 in the test installer was executed. For example, as indicated in the record 804, the advice at the join point identifier 814 of "method A, class F" was executed for the first time (sequence number 816 of "1") five seconds after the start of the execution of the test installer. As indicated in the record 806, the advice at the join point identifier 814 of "method C, class H" was executed for the first time (sequence number 816 of "1") ten seconds after the start of the execution of the test installer. As indicated in the record 808, the advice at the join point identifier 814 of "method C, class H" was executed for the second time (sequence number 816 of "2") twenty seconds after the start of the execution of the test installer. As indicated in the record 810, the advice at the join point identifier 814 of "method E, class J" was executed for the first time (sequence number 816 of "1") thirty seconds after the start of the execution of the test installer. As indicated in the record 812, the advice at the join point identifier 814 of "method C, class H" was executed for the third time (sequence number 816 of "3") forty-five seconds after the start of the execution of the test installer.

The completion progress field 820 specifies the amount of time or progress for the production installer that is associated with, or is assigned to, the combination of the join point identifier 814 and the sequence number 816 in the record. Thus, when advice in the production installer executes at a join point with a sequence number that are identical to the join point 814 and sequence number 816 of advice that executed in the test installer, the completion progress 820 is presented. The completion progress 820 is calculated based on the elapsed time 818 at which the advice in the test installer executed at the join point 814 with the sequence number 816. In various embodiments, the completion progress 820 may be expressed as an absolute amount or as a percentage of the total expected time that the execution of the production installer is expected to use. In various embodiments, the completion progress 820 may be expressed in terms of an amount of progress already completed or an amount remaining to be completed.

The record 804 indicates that when the advice in the production installer at the join point identifier 814 of "method A, class F" is executed for the first time (the sequence number 816 of "1"), then the execution of the production installer is 8% complete (the completion progress 820 stores "8%"). The record 806 indicates that when the advice in the production installer at the join point identifier 814 of "method C, class H" is executed for the first time (the sequence number 816 of "1"), then the execution of the production installer is 17% complete (the completion progress 820 stores "17%"). The record 808 indicates that when the advice in the production installer at the join point identifier 814 of "method C, class H" is executed for the second time (the sequence number 816 of "2"), then the execution of the production installer is 33% complete (the completion progress 820 stores "33%"). The record 810 indicates that when the advice in the production installer at the join point identifier 814 of "method E, class J" is executed for the first time (the sequence number 816 of "1"), then the execution of the production installer is 50% complete (the completion progress 820 stores "50%"). The record 812 indicates that when the advice in the production installer at the join point identifier 814 of "method C, class H" is executed for the third time (the sequence number 816 of "3"), then the execution of the production installer is 75% complete (the completion progress 820 stores "75%").

FIG. 8B depicts a block diagram of an example data structure for a standard profile 156-2, according to an embodiment of the invention. The production installer selects and uses the standard profile 156-2 in response to selection of the standard installation option 305-2 (FIG. 3). The standard profile 156-2 is assigned to, or associated with the standard installation option 305-2. The profile 156 (FIG. 1) generically refers to the standard profile 156-2.

The standard profile 156-2 includes a method/class profile 801-2 and a production point cut status 802-2. The method/class profile 801-2 includes a specification of a subset of the methods and/or classes in the production installer that is assigned to, or associated with the standard installation option 305-2. In response to selection of the standard installation option 305-2, the production installer executes the subset of its methods that is specified in the method/class profile 801-2. The method/class profile 801-2 further specifies the join points or locations in the production installer where the weaver 160 inserts advice, as further described below with reference to FIGS. 9 and 10B, and these join points specified by the method/class profile 801-2 for the production installer are a subset of the join points in the test installer, e.g., the join points specified by the point cut 505 in the test install aspect 150.

The production point cut status 802-2 includes example records 830, 832, 834, 836, 838, and 840, each of which represents an execution of the advice at the respective join point 814. Each of the example records 830, 832, 834, 836, 838, and 840 includes a join point identifier field 814, a sequence number field 816, an elapsed time field 818, and a completion progress field 820. The join point identifier field 814 identifies a join point or location in the test installer. In an embodiment, the join point identifier field 814 specifies a method and/or class within the test installer.

The sequence number field 816 specifies an order of execution of the advice at the join point 814 with respect to other times that the same advice was executed at the same join point 814. For example, records 832, 834, and 838 all specify the same join point identifier 814, which is "method C, class H," but each of the records 832, 834, and 838 have different sequence numbers 816, which are 1, 2, and 3, respectively. Thus, the record 832 represents the first time (sequence number 816 of "1") that the advice at the join point 814 of "method C, class H" was executed. The record 834 represents the second time (sequence number 816 of "2") that the advice at the join point 814 of "method C, class H" was executed. The record 838 represents the third time (sequence number 816 of "3") that the advice at the join point 814 of "method C, class H" was executed. The records 830, 836, and 840 have sequence numbers 816 of "1" because the advice at the join point identifiers 814 "method A, class F," "method E, class J," and "method D, class I" were only executed one time by the test installer.

The elapsed time field 818 stores the elapsed time since the beginning of the execution of the test installer that the advice at the respective join point identifier 814 was executed. For example, as indicated in the record 830, the advice at the join point identifier 814 of "method A, class F" was executed for the first time (sequence number 816 of "1") five seconds after the start of the execution of the test installer. As indicated in the record 832, the advice at the join point identifier 814 of "method C, class H" was executed for the first time (sequence number 816 of "1") ten seconds after the start of the execution of the test installer. As indicated in the record 834, the advice at the join point identifier 814 of "method C, class H" was executed for the second time (sequence number 816 of "2") twenty seconds after the start of the execution of the test installer. As indicated in the record 836, the advice at the join point identifier 814 of "method E, class J" was executed for the first time (sequence number 816 of "1") thirty seconds after the start of the execution of the test installer. As indicated in the record 838, the advice at the join point identifier 814 of "method C, class H" was executed for the third time (sequence number 816 of "3") forty-five seconds after the start of the execution of the test installer. As indicated in the record 840, the advice at the join point identifier 814 of "method D, class I" was executed for the first time (sequence number 816 of "1") seventy seconds after the start of the execution of the test installer.

The completion progress field 820 specifies the amount of time or progress for the production installer that is associated with, or is assigned to, the combination of the join point identifier 814 and the sequence number 816 in the record. Thus, when advice in the production installer executes at a join point with a sequence number that are identical to the join point 814 and sequence number 816 of advice that executed in the test installer, the completion progress 820 is presented. The completion progress 820 is calculated based on the elapsed time 818 at which the advice in the test installer executed at the join point 814 with the sequence number 816. In various embodiments, the completion progress 820 may be expressed as an absolute amount or as a percentage of the total expected time that the execution of the production installer is expected to use. In various embodiments, the completion progress 820 may be expressed in terms of an amount of progress already completed or an amount remaining to be completed.

Thus, the record 830 indicates that when the advice in the production installer at the join point identifier 814 of "method A, class F" is executed for the first time (the sequence number 816 of "1"), then the execution of the production installer is 7% complete (the completion progress 820 stores "7%"). The record 832 indicates that when the advice in the production installer at the join point identifier 814 of "method C, class H" is executed for the first time (the sequence number 816 of "1"), then the execution of the production installer is 13% complete (the completion progress 820 stores "13%"). The record 834 indicates that when the advice in the production installer at the join point identifier 814 of "method C, class H" is executed for the second time (the sequence number 816 of "2"), then the execution of the production installer is 27% complete (the completion progress 820 stores "27"). The record 836 indicates that when the advice in the production installer at the join point identifier 814 of "method E, class J" is executed for the first time (the sequence number 816 of "1"), then the execution of the production installer is 40% complete (the completion progress 820 stores "40%"). The record 838 indicates that when the advice in the production installer at the join point identifier 814 of "method C, class H" is executed for the third time (the sequence number 816 of "3"), then the execution of the production installer is 60% complete (the completion progress 820 stores "60%"). The record 840 indicates that when the advice in the production installer at the join point identifier 814 of "method D, class I" is executed for the first time (the sequence number 816 of "1"), then the execution of the production installer is 93% complete (the completion progress 820 stores "93%").

FIG. 8C depicts a block diagram of an example data structure for a deluxe profile 156-3, according to an embodiment of the invention. The production installer selects and uses the deluxe profile 156-3 in response to selection of the deluxe installation option 305-3 (FIG. 3). The deluxe profile 156-3 is assigned to, or associated with the deluxe installation option 305-3. The profile 156 (FIG. 1) generically refers to the deluxe profile 156-3.

The deluxe profile 156-3 includes a method/class profile 801-3 and a production point cut status 802-3. The method/class profile 801-3 includes a specification of a subset of the methods and/or classes in the production installer that is assigned to, or associated with the deluxe installation option 305-3. In response to selection of the deluxe installation option 305-3, the production installer executes the subset of its methods that is specified in the method/class profile 801-3. The method/class profile 801-3 further specifies the join points or locations in the production installer where the weaver 160 inserts advice, as further described below with reference to FIGS. 9 and 10C, and these join points specified by the method/class profile 801-3 for the production installer are a subset of the join points in the test installer.

The production point cut status 802-3 includes example records 850, 852, 854, 856, 858, 860, and 862, each of which represents an execution of the advice at the respective join point 814. Each of the example records 850, 852, 854, 856, 858, 860, and 862 includes a join point identifier field 814, a sequence number field 816, an elapsed time field 818, and a completion progress field 820. The join point identifier field 814 identifies a join point or location in the test installer. In an embodiment, the join point identifier field 814 specifies a method and/or class within the test installer.

The sequence number field 816 specifies an order of execution of the advice at the join point 814 with respect to other times that the same advice was executed at the same join point 814. For example, records 852, 854, and 858 all specify the same join point identifier 814, which is "method C, class H," but each of the records 852, 854, and 858 have different sequence numbers 816, which are 1, 2, and 3, respectively. Thus, the record 852 represents the first time (sequence number 816 of "1") that the advice at the join point 814 of "method C, class H" was executed. The record 854 represents the second time (sequence number 816 of "2") that the advice at the join point 814 of "method C, class H" was executed. The record 858 represents the third time (sequence number 816 of "3") that the advice at the join point 814 of "method C, class H" was executed. The records 850, 856, 860, and 862 all have sequence numbers 816 of "1" because the advice at the join point identifiers 814 "method A, class F," "method B, class G," "method E, class J," and "method D, class I" were only executed one time by the test installer.

The elapsed time field 818 stores the elapsed time since the beginning of the execution of the test installer at which the advice at the respective join point identifier 814 was executed. For example, as indicated in the record 850, the advice at the join point identifier 814 of "method A, class F" was executed for the first time (sequence number 816 of "1") five seconds after the start of the execution of the test installer. As indicated in the record 852, the advice at the join point identifier 814 of "method C, class H" was executed for the first time (sequence number 816 of "1") ten seconds after the start of the execution of the test installer. As indicated in the record 854, the advice at the join point identifier 814 of "method C, class H" was executed for the second time (sequence number 816 of "2") twenty seconds after the start of the execution of the test installer. As indicated in the record 856, the advice at the join point identifier 814 of "method B, class G" was executed for the first time (sequence number 816 of "1") thirty-five seconds after the start of the execution of the test installer. As indicated in the record 858, the advice at the join point identifier 814 of "method C, class H" was executed for the third time (sequence number 816 of "3") forty-five seconds after the start of the execution of the test installer. As indicated in the record 860, the advice at the join point identifier 814 of "method E, class J" was executed for the first time (sequence number 816 of "1") one minute after the start of the execution of the test installer. As indicated in the record 862, the advice at the join point identifier 814 of "method D, class I" was executed for the first time (sequence number 816 of "1") one minute and fifteen seconds after the start of the execution of the test installer.

The completion progress field 820 specifies the amount of time or progress for the production installer that is associated with, or is assigned to, the combination of the join point identifier 814 and the sequence number 816 in the record. Thus, when advice in the production installer executes at a join point with a sequence number that are identical to the join point 814 and sequence number 816 of advice that executed in the test installer, the completion progress 820 is presented. The completion progress 820 is calculated based on the elapsed time 818 at which the advice in the test installer executed at the join point 814 with the sequence number 816. In various embodiments, the completion progress 820 may be expressed as an absolute amount or as a percentage of the total expected time that the execution of the production installer is expected to use. In various embodiments, the completion progress 820 may be expressed in terms of an amount of progress already completed or an amount remaining to be completed.

The record 850 indicates that when the advice in the production installer at the join point identifier 814 of "method A, class F" is executed for the first time (the sequence number 816 of "1"), then the execution of the production installer is 6% complete (the completion progress 820 stores "6%"). The record 852 indicates that when the advice in the production installer at the join point identifier 814 of "method C, class H" is executed for the first time (the sequence number 816 of "1"), then the execution of the production installer is 13% complete (the completion progress 820 stores "13%"). The record 854 indicates that when the advice in the production installer at the join point identifier 814 of "method C, class H" is executed for the second time (the sequence number 816 of "2"), then the execution of the production installer is 25% complete (the completion progress 820 stores "25%"). The record 856 indicates that when the advice in the production installer at the join point identifier 814 of "method B, class G" is executed for the first time (the sequence number 816 of "1"), then the execution of the production installer is 44% complete (the completion progress 820 stores "44%"). The record 858 indicates that when the advice in the production installer at the join point identifier 814 of "method C, class H" is executed for the third time (the sequence number 816 of "3"), then the execution of the production installer is 56% complete (the completion progress 820 stores "56%"). The record 860 indicates that when the advice in the production installer at the join point identifier 814 of "method E, class J" is executed for the first time (the sequence number 816 of "1"), then the execution of the production installer is 75% complete (the completion progress 820 stores "75%"). The record 862 indicates that when the advice in the production installer at the join point identifier 814 of "method D, class I" is executed for the first time (the sequence number 816 of "1"), then the execution of the production installer is 94% complete (the completion progress 820 stores "94%").

FIG. 9 depicts a block diagram of an example data structure for a production install aspect 258, according to an embodiment of the invention. The production install aspect 258 includes a point cut 905, a before statement 910, and advice 915. The production installer selects one of the profiles 156-1, 156-2, or 156-3 corresponding to a selected installation option 305-1, 305-2, or 305-3, and copies the join points specified in the corresponding method class profile 801-1, 801-2 or 801-3 into the point cut 905. The point cut 905 then specifies a set of join points in the production installer, which may be a specification of a subset of the methods in the production installer.

When the weaver 160 executes, the weaver 160 inserts (copies or weaves) the advice 915 before (as specified by the "before" statement 910) the methods specified in the point cut 905 into the production installer 164, as further described below with reference to FIGS. 10A, 10B, and 10C. Although the production install aspect 258 includes a before statement 910, which instructs the weaver 160 to copy and insert the advice 915 at a location within the production installer that is "before" the join points specified by the point cut 905, in another embodiment, the production install aspect 258 may include an "after" statement, which instructs the weaver 160 to weave (copy and insert) the advice 915 at a location within the production installer that is "after" the methods specified by the point cut 905.

In response to the execution of the production installer reaching one of the join points specified in the point cut, the advice 915 (a method or code fragment) associated with the point cut is executed. The advice, when executed at its associated join point, sends the class name and the method name of its associated join point to the install status method 430 of the production installer.

Figure 10A:
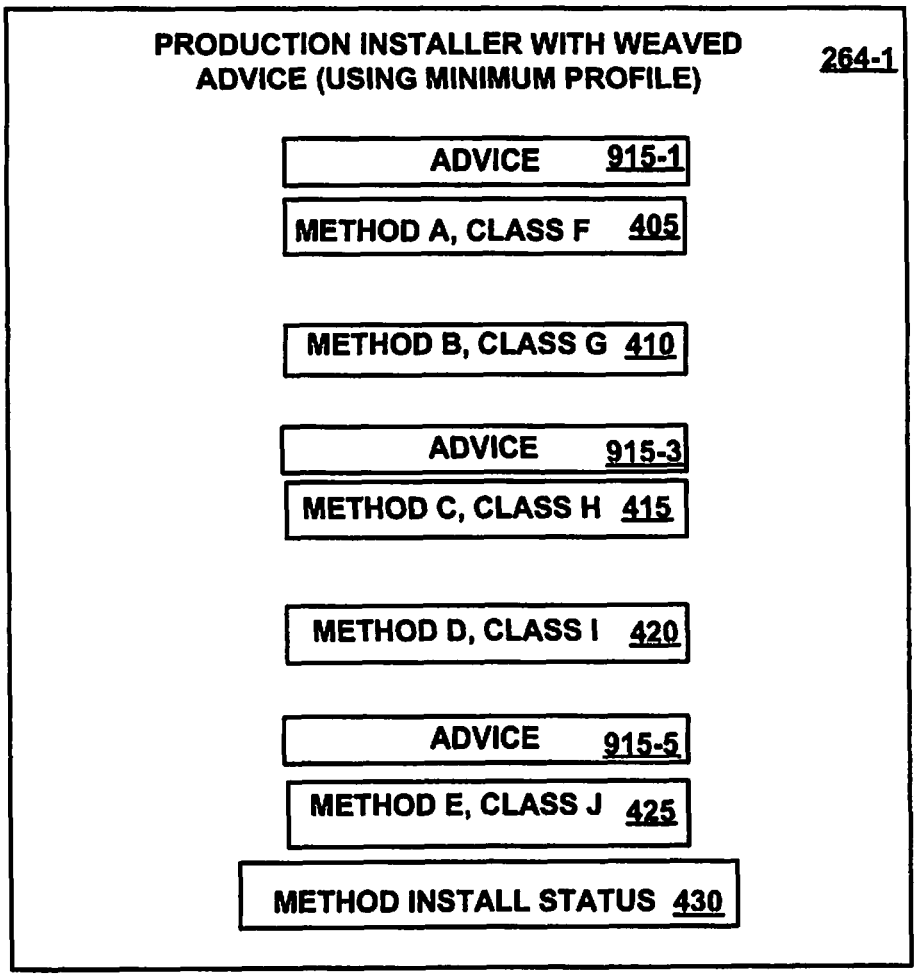
FIG. 10A depicts a block diagram of an example production installer with weaved advice created from a minimum profile, according to an embodiment of the invention.

FIG. 10A depicts a block diagram of an example production installer 264-1, according to an embodiment of the invention. The production installer 264 (FIG. 2) generically refers to the production installer 264-1. The example production installer 264-1 includes weaved advice 915-1, 915-3, and 915-5 created from the minimum profile 156-1 associated with the minimum installation option 305-1. The production installer (with weaved advice) 264-1 describes the production installer after the weaver 160 has weaved in the advice 915-1, 915-3, and 915-5 specified by the production install aspect 258 at the join points in the production installer specified by the point cut 905 of the production install aspect 258 (after the method/class profile 801-1 was copied to the point cut 905). The advice 915 (FIG. 9) generically refers to the advice 915-1, 915-3, and 915-5.

Thus, as illustrated in FIG. 10A, the weaver 160 has copied and inserted the advice 915-1, 915-3, and 915-5 (which are all copies of the advice 915 of FIG. 9) at the join points within the production installer 264-1 before the respective methods 405, 415, and 425 because the production install aspect 258 included the before statement 910, the advice 915, and the point cut 905, and because the point cut 905 specified the methods 405, 415, and 425 (after the production installer copied the methods 801-1 from the minimum profile 156-1 to the point cut 905). The methods 410, 420, and 430 were not specified by the point cut 905 as join points, so the weaver 160 did not insert any advice 915 before the methods 410, 420, and 430 in the production installer 264-1.

In response to the execution of the production installer 264-1 reaching one of the join points specified in the point cut 905, the respective advice 915-1, 915-3, or 915-5 is executed, which sends the respective class name and method name associated with its join point to the install status method 430.

For example, every time that the advice 915-1 executes on the processor 201, the advice 915-1 sends the method name "method A" and the class name "class F" to the install status method 430. Every time that the advice 915-3 executes on the processor 201, the advice 915-3 sends the method name "method C" and the class name "class H" to the install status method 430. Every time that the advice 915-5 executes on the processor 201, the advice 915-5 sends the method name "method E" and the class name "class J" to the install status method 430.

Figure 10B:
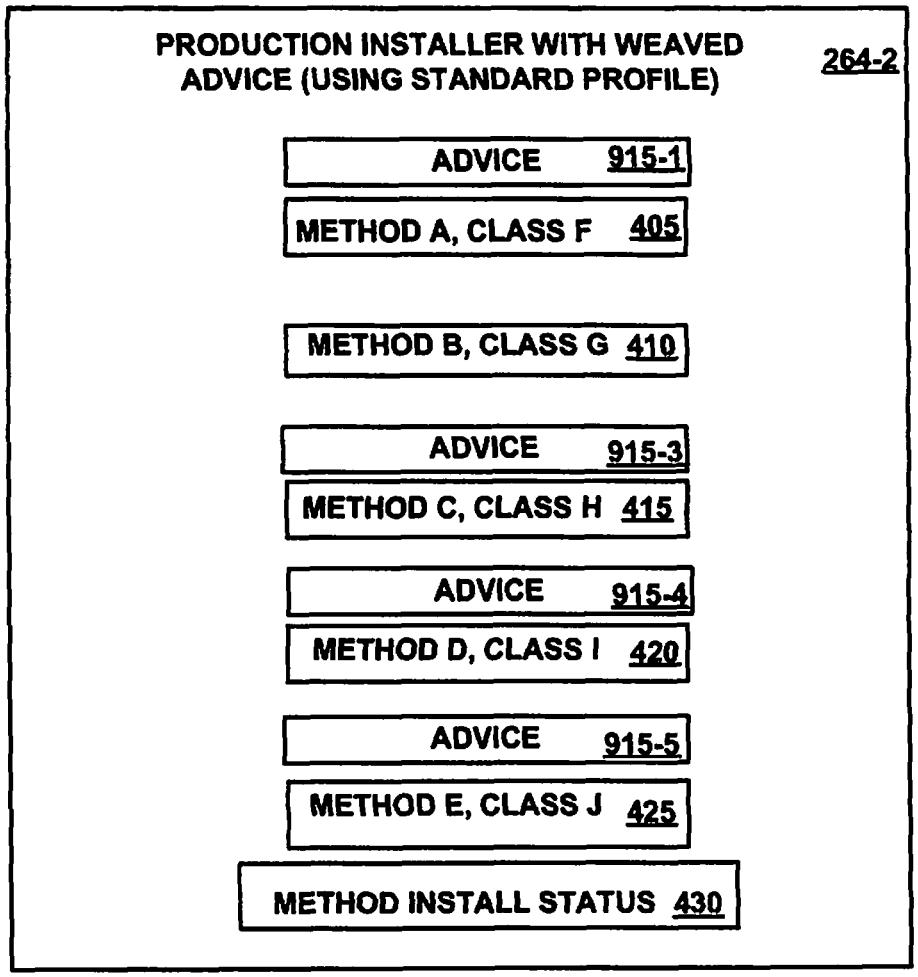
FIG. 10B depicts a block diagram of an example production installer with weaved advice created from a standard profile, according to an embodiment of the invention.

FIG. 10B depicts a block diagram of an example production installer 264-2, according to an embodiment of the invention. The production installer 264 (FIG. 2) generically refers to the production installer 264-2. The example production installer 264-2 includes weaved advice 915-1, 915-3, 915-4, and 915-5 created from the standard profile 156-2 associated with the standard installation option 305-2. The production installer (with weaved advice) 264-2 describes the production installer after the weaver 160 has weaved in the advice 915-1, 915-3, 915-4, and 915-5 specified by the production install aspect 258 at the join points in the production installer specified by the point cut 905 of the production install aspect 258 (after the method/class profile 801-2 was copied to the point cut 905). The advice 915 (FIG. 9) generically refers to the advice 915-1, 915-3, 915-4, and 915-5.

Thus, as illustrated in FIG. 10B, the weaver 160 has copied and inserted the advice 915-1, 915-3, 915-4, and 915-5 (which are all copies of the advice 915 of FIG. 9) at the locations of the join points within the production installer 264-2 before the respective methods 405, 415, 420, and 425 because the production install aspect 258 included the before 910 statement, the advice 915, and the point cut 905, and because the point cut 905 specified the methods 405, 415, 420 and 425 after the production installer copied the methods 801-2 from the standard profile 156-2 to the point cut 905. The methods 410 and 430 were not specified by the point cut 905 as join points, so the weaver 160 did not insert any advice before the methods 410 and 430 in the production installer 264-2.

In response to the execution of the production installer 264-2 reaching one of the join points specified in the point cut 905, the respective advice 915-1, 915-3, 915-4, or 915-5 is executed, which sends the respective class name and method name associated with its join point to the install status method 430.

For example, every time that the advice 915-1 executes on the processor 201, the advice 915-1 sends the method name "method A" and the class name "class F" to the install status method 430. Every time that the advice 915-3 executes on the processor 201, the advice 915-3 sends the method name "method C" and the class name "class H" to the install status method 430. Every time that the advice 915-4 executes on the processor 201, the advice 915-4 sends the method name "method D" and the class name "class I" to the install status method 430. Every time that the advice 915-5 executes on the processor 201, the advice 915-5 sends the method name "method E" and the class name "class J" to the install status method 430.

Figure 10C:
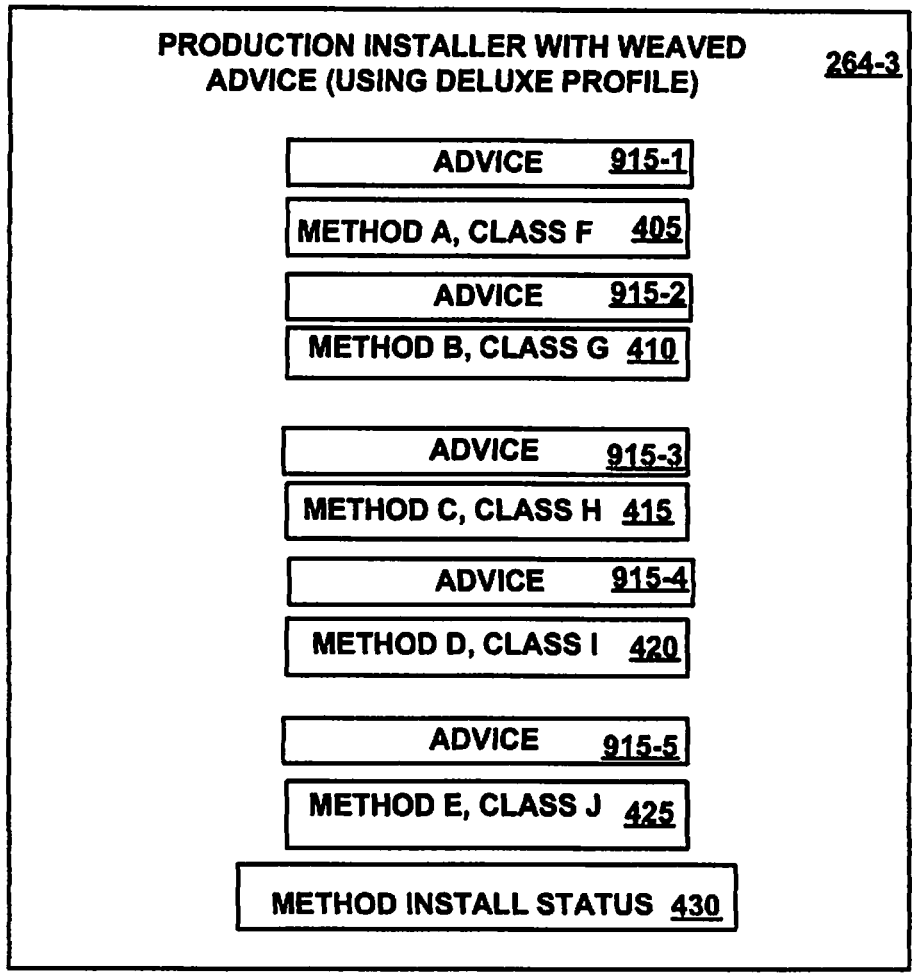
FIG. 10C depicts a block diagram of an example production installer with weaved advice created from a deluxe profile, according to an embodiment of the invention.

FIG. 10C depicts a block diagram of an example production installer 264-3, according to an embodiment of the invention. The production installer 264 (FIG. 2) generically refers to the production installer 264-3. The example production installer 264-3 includes weaved advice 915-1, 915-2, 915-3, 915-4, and 915-5 created from the deluxe profile 156-3 associated with the deluxe installation option 305-3. The production installer (with weaved advice) 264-3 describes the production installer after the weaver 160 has weaved in the advice 915-1, 915-2, 915-3, 915-4, and 915-5 specified by the production install aspect 258 at the join points in the production installer specified by the point cut 905 of the production install aspect 258 (after the method/class profile 801-3 was copied to the point cut 905). The advice 915 (FIG. 9) generically refers to the advice 915-1, 915-2, 915-3, 915-4, and 915-5.

Thus, as illustrated in FIG. 10C, the weaver 160 has copied and inserted the advice 915-1, 915-2, 915-3, 915-4, and 915-5 (which are all copies of the advice 915 of FIG. 9) at the join points within the production installer 264-3 before the respective methods 405, 410, 415, 420, and 425 because the production install aspect 258 included the before 910 statement, the advice 915, and the point cut 905, and because the point cut 905 specified the methods 405, 410, 415, 420 and 425 after the production installer copied the methods 801-3 from the deluxe profile 156-3 to the point cut 905. The method 430 was not specified by the point cut 905 as a join point, so the weaver 160 did not insert any advice before the method 430 in the production installer 264-3.

In response to the execution of the production installer 264-3 reaching one of the join points specified in the point cut 905, the respective advice 915-1, 915-2, 915-3, 915-4, or 915-5 is executed, which sends the respective class name and method name associated with its join point to the install status method 430.

For example, every time that the advice 915-1 executes on the processor 201, the advice 915-1 sends the method name "method A" and the class name "class F" to the install status method 430. Every time that the advice 915-2 executes on the processor 201, the advice 915-2 sends the method name "method B" and the class name "class G" to the install status method 430. Every time that the advice 915-3 executes on the processor 201, the advice 915-3 sends the method name "method C" and the class name "class H" to the install status method 430. Every time that the advice 915-4 executes on the processor 201, the advice 915-4 sends or stores the method name "method D" and the class name "class I" to the install status method 430. Every time that the advice 915-5 executes on the processor 201, the advice 915-5 sends the method name "method E" and the class name "class J" to the install status method 430.

Figure 11:
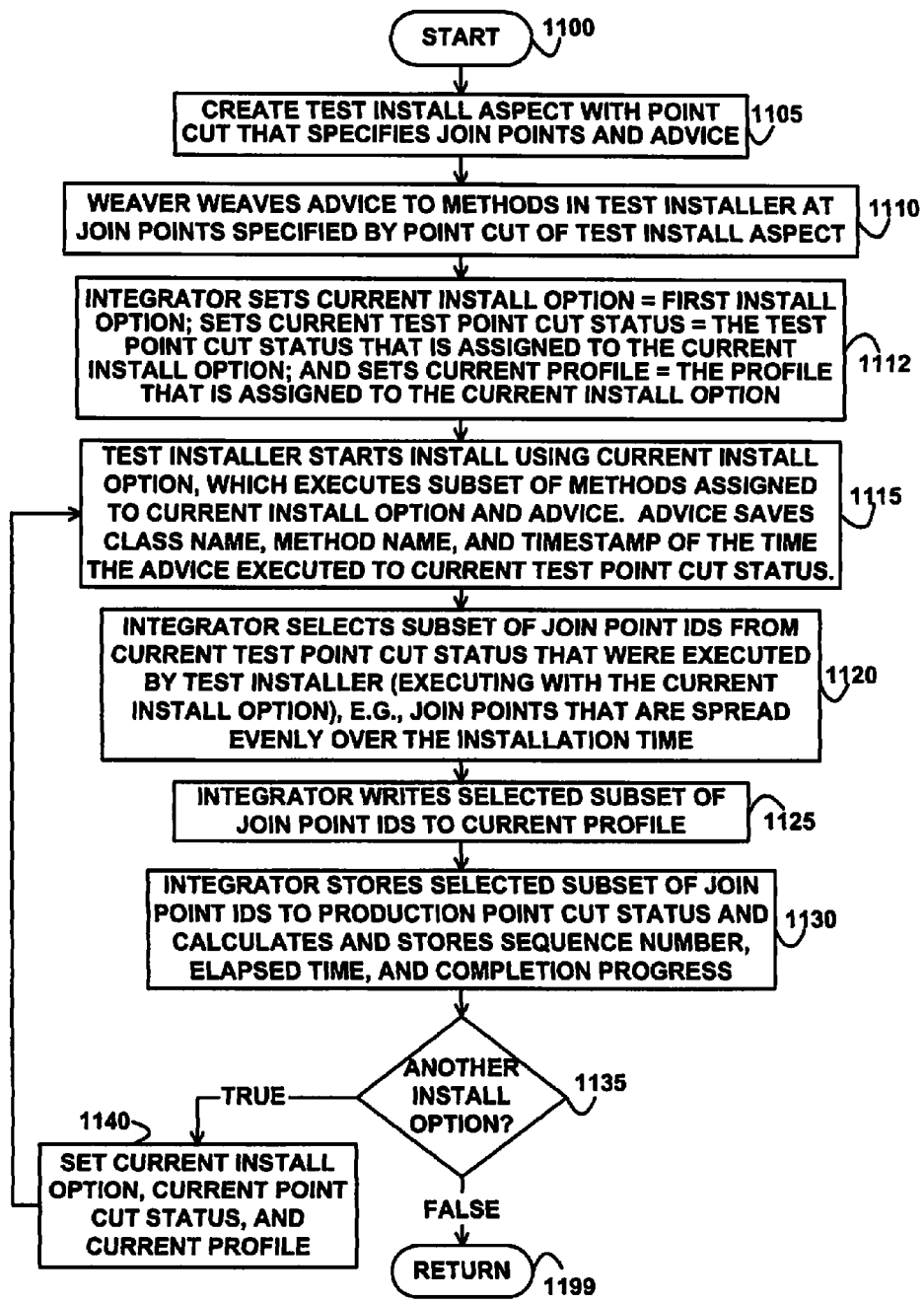
FIG. 11 depicts a flowchart of example processing for creating profiles, according to an embodiment of the invention.

FIG. 11 depicts a flowchart of example processing for creating profiles, according to an embodiment of the invention. Control begins at block 1100. Control then continues to block 1105 where the test install aspect 150 is created that specifies advice 515 and a point cut 505 that together with a before 510 statement (or an after statement) specify join points in the test installer. Control then continues to block 1110 where the weaver 160 weaves (inserts, merges, and/or copies) the advice 515 (specified in the test install aspect 150) to the join points (specified by the point cut 505 and the statement 510 in the test install aspect 150) at locations before or after the methods in the test installer 164.

Control then continues to block 1112 where the integrator 148 sets the current installation option that will be used by the current execution of the test installer 164, as further described below, to be the first installation option, such as the installation option 305-1, 305-2, or 305-3. The integrator 148 further sets the current test point cut status to be the test point cut status 152 that is assigned to the current installation option and sets the current profile to be the profile that is assigned to the current installation option. For example, if the first installation option is the installation option 305-1, the integrator 148 sets the current installation option to be the minimum installation option 305-1, sets the current test point cut status to be the test point cut status 152-1, and sets the current profile to be the profile 156-1.

Control then continues to block 1115 where the integrator 148 starts the test installer 164 executing on a processor 101 of the computer system 100 using the current installation option, the current test point cut status, and the current profile. In response to the current installation option, the test installer 164 selects and invokes different subsets or combinations of the methods within the test installer 164 that are assigned to, or are associated with, that installation option, in order to execute or install different programs, subprograms, applications, functions, and/or data to the computer system 100. For example, if the current installation option is the minimum installation option 305-1, the test installer 164 selects and invokes the "method A, class F" 405, the "method C, class H" 415 and the "method E, class J" 425 as can be see in FIGS. 6 and 7A. Each of the advice 515-1, 515-2, 515-3, 515-4, and 515-5, when and if executed at each of the join points in the test installer 164, saves its associated join point identifier 712 and time 714 that the respective advice executed to a record in the current test point cut status.

Control then continues to block 1120 where, after completion of the current execution of the test installer 164, the integrator 148 selects or determines a subset of all of the join points in the records that are specified in the current test point cut status. In an embodiment, integrator 148 selects those records in the current test point cut status that are evenly spread across the total time that the execution of the test installer 164 consumed while using the current installation option. In an embodiment, the integrator 148 calculates the time duration between the time stamp 714 of each record and its adjacent record, ordered by the values in the time field 714. If the record is the first record in time after the start of the execution of the test installer 164 (e.g., the record 702 in FIG. 7A), or the last record in time before the end of the execution of the test installer 164 (e.g., the record 710 in FIG. 7A), then the integrator 148 calculates the time duration between that time stamp and the start or end, respectively, of execution of the test installer. The integrator 148 then discards the record for the join point 712 whose time durations from its adjacent records in time (or from the start or end of execution) is the shortest. The integrator 148 continues in this manner, discarding the record with the shortest durations until the time durations between the join points in the subset are within a threshold amount of time of being equal, i.e., until the join points are approximately evenly spread across the execution time of the test point installer.

Control then continues to block 1125 where the integrator 148 writes or stores the selected subset of the join point identifiers 712 to the current profile, such as the profile 801-1, 801-2, or 801-3.

Control then continues to block 1130 where the integrator 148 stores or saves the selected subset of the join point identifiers to the current production point cut status (e.g., to the field 814 in records of the production point cut status 802-1, 802-2, or 802-3). The integrator 148 further calculates and stores (to the records in the production point cut status 802-1, 802-2, or 802-3) a completion progress 820 for each of the join points 814 in the selected subset based on the times 714 that the respective advice executed at the join point 712. In an embodiment, the integrator 148 performs the calculation by calculating the elapsed time 818 from the start of the executing of the test installer 164 to the time 714 that each respective advice was executed for each of the join points 814 in the selected subset. The integrator 148 then determines the total time that was used or consumed the execution of the test installer 164 using the current installation option. The integrator 148 then calculates the completion progress 820 for each of the elapsed times 818, e.g., by dividing each of the respective elapsed times 818 by the total execution time of the test installer 164 while using the current installation option.

The integrator 148 further calculates the sequence number 816 for each of the join points identifiers 814 in the current production point cut status. The sequence number 816 represent a sequence of possible multiple executions of the advice at the join point identifier 814. For example, as illustrated in FIG. 8A, the "method C, class H" was executed three times, so its associated advice was also executed three times, so the records 806, 808, and 812 store a respective sequence number 816 of one, two, or three, indicating the three different executions of the advice at that join point 814 in time order with respect to each other in their sequence of execution.

Control then continues to block 1135 where the integrator 148 determines whether another installation option exists that has not yet been used during an execution of the test installer 164. If the determination at block 1135 is true, then another installation option exists that has not yet been used during an execution of the test installer 164, so control continues to block 1140 where the integrator 148 sets the current installation option to be next installation option, sets the current test point cut status to be the test point cut status that is assigned to the next installation option, and sets the current profile to be the profile that is assigned to the next installation option. Control then returns to block 1115 where the test installer 164 once again executes, as previously described above.

If the determination at block 1135 is false, then the test installer 164 has executed with all installation options, so control continues to block 1199 where the logic of FIG. 11 returns.

Figure 12:
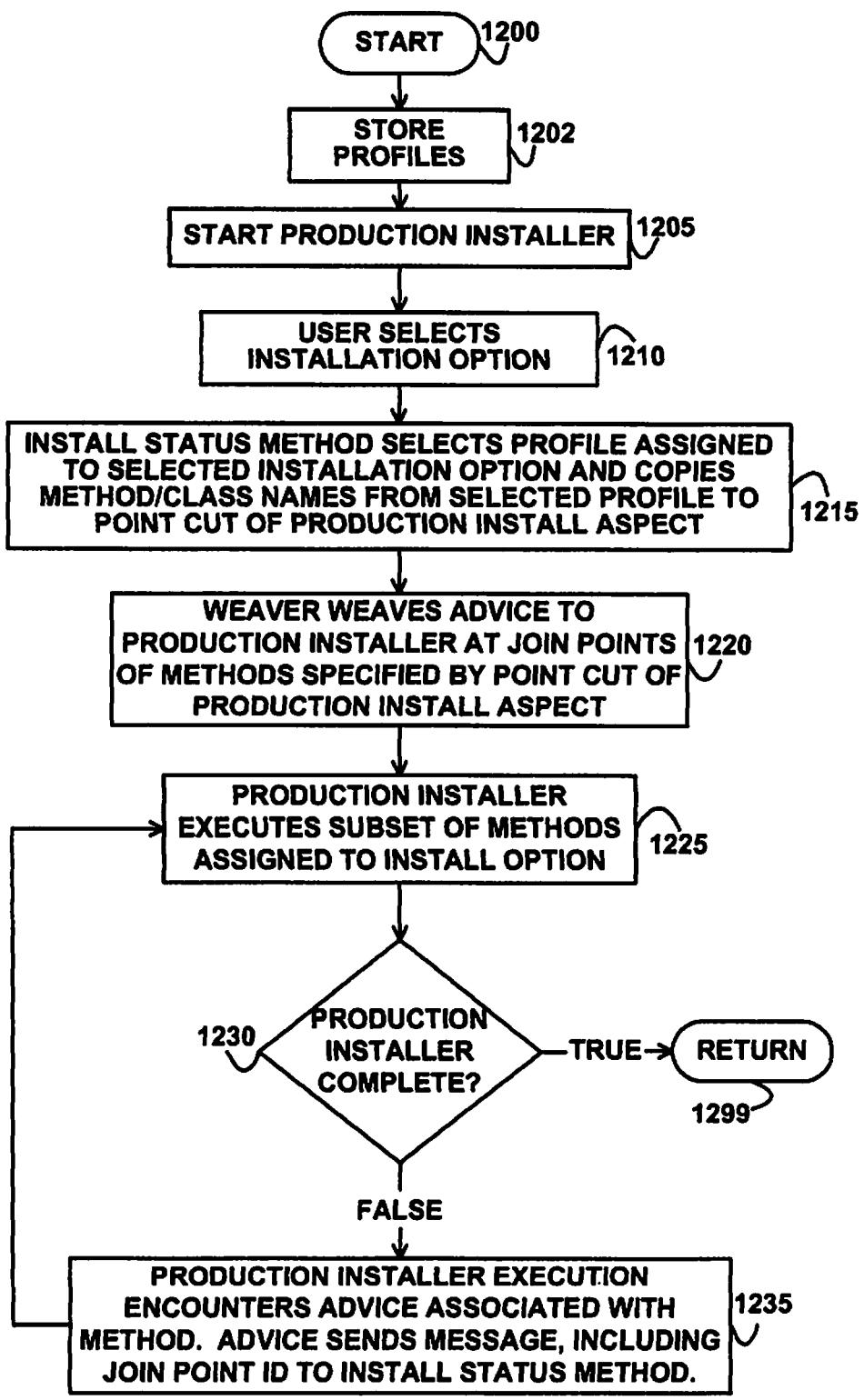
FIG. 12 depicts a flowchart of example processing for a production installer, according to an embodiment of the invention.

FIG. 12 depicts a flowchart of example processing for a production installer, according to an embodiment of the invention. Control begins at block 1200. Control then continues to block 1202 where the profiles 156 that were previously created as described in FIG. 11 are stored to the computer system 200. Control then continues to block 1205 where the production installer 264 starts executing on a processor 201 of the computer system 200. Control then continues to block 1210 where the production installer 264 presents the installation user interface 300 via the terminal 221 and the user selects an installation option, such as the installation option 305-1, 305-2, or 305-3.

Control then continues to block 1215 where the install status method 430 selects the profile that is assigned to the selected installation option and copies the method and class names from the selected profile to the point cut 905 of the production install aspect 258. The subset of the join points are now specified by the point cut 905. The method and class names are a specification of a subset of the join points that are assigned to the selected installation option. Thus, each different installation option causes the production installer 264 to execute a different combination or subset of the methods in the production installer 264.

Control then continues to block 1220 where the weaver 160 weaves (copies and inserts) the advice 915 from the production install aspect 258 to the subset of the join points at the locations in the production installer 264 that are specified by the point cut 905 and the statement 910. Control then continues to block 1225 where the production installer 264 executes one or more of the methods that are assigned to the selected installation option.

Control then continues to block 1230 where the production installer 264 determines whether the installation is complete. If the determination at block 1230 is true, then the installation is complete, so control continues to block 1299 where the logic of FIG. 12 returns.

If the determination at block 1230 is false, then the execution of the production installer 264 is not complete, so control continues to block 1235 where the production installer encounters the weaved advice at a join point location within the production installer 264 and executes the advice. The executed advice sends a message that includes an identifier of its join point (e.g., the method and class name) that is associated with the advice to the install status method 430.

Control then returns to block 1225 where the production installer 264 continues executing, as previously described above.

Figure 13:
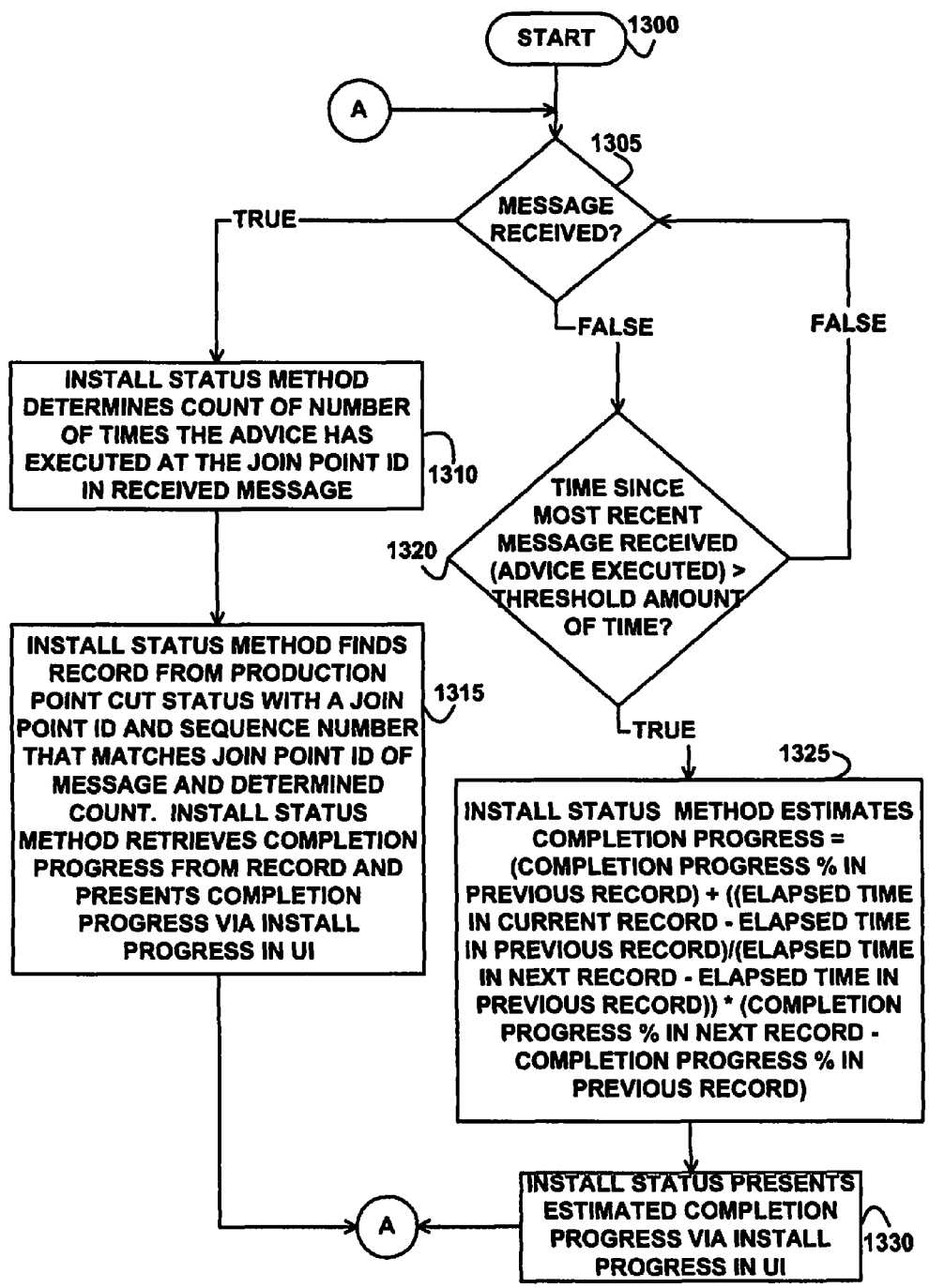
FIG. 13 depicts a flowchart of example processing for an install status method, according to an embodiment of the invention.

FIG. 13 depicts a flowchart of example processing for an install status method, according to an embodiment of the invention. Control begins at block 1300. Control then continues to block 1305 where the install status method 430 determines whether it has received a message from advice located at one of the join points in the production installer 264. (The message was sent by the advice at block 1235 of FIG. 12.) If the determination at block 1305 is true, then the install status method 430 has received a message from advice located at one of the join points in the production installer 264, so control continues to block 1310 where the install status method 430 determines a count of the number of times that the advice that sent the received message has executed at the join point in the production installer 264 that is identified by the join point identifier in the received message.

Control then continues to block 1315 where the install status method 430 determines the production point cut status 802-1, 802-2, or 802-3 that is assigned to the corresponding installation option 305-1, 305-2, or 305-3 under which the production installer 264 is executing. The install status method 430 then finds the record in the determined production point cut status that includes a join point identifier that matches the join point identifier in the received message and that includes a sequence number 816 that matches the determined count (calculated at block 1310). The install status method 430 of the production installer 264 then retrieves the completion progress 820 from the found record and presents the completion progress 820 via the install progress 310 of the user interface 300. Thus, the install status method 430 presents the progress status of the production installer 264 based on the elapsed times (for the advice at the selected subset of the join points) that were measured during the execution of the test installer 164 that used the same installation option as that which the production installer 264 is currently using.

Control then returns to block 1305 where the install status method 430 again determines whether a message has been received, as previously described above.

If the determination at block 1305 is false, then the install status method 430 has not received a message, so control continues to block 1320 where the install status method 430 determines whether the amount of time that has elapsed since the most-recent message was received from the advice (the elapsed time since the most-recent advice executed) is greater than a threshold amount of time. If the determination at block 1320 is true, then the install progress 310 on the user interface 300 has not been updated recently, so control continues to block 1325 where the install status method 430 estimates the completion progress of the installation process since the time that the most recent advice executed. The install status method 430 calculates the estimated completion progress to be (the completion progress percentage from the previous record)+((the elapsed time in the current record−the elapsed time in the previous record)/(the elapsed time in next record−elapsed time in the previous record))*(completion progress percentage in the next record−the completion progress percentage in the previous record).

The current record is the record in the production point cut status 802-1, 802-2, or 802-3 (that is assigned to the corresponding installation option 305-1, 305-2, or 305-3 under which the production installer 264 is executing.) that was used (at block 1315) to determine the progress status 310 that is currently presented via the user interface 300. The previous record is the record in the production point cut status immediately previous to the current record (as sorted by the elapsed time 818 from the beginning of the execution of the test installer 164 to the end of the execution of the test installer 164). The next record is the record in the production point cut status immediately after the current record (as sorted by the elapsed time 818 from beginning to the end of execution of the test installer 164).

Control then continues to block 1330 where the install status method 430 presents the estimated completion progress percentage (that was calculated by block 1325) via the progress status 310 of the user interface 300. Control then returns to block 1305, as previously described above.

If the determination at block 1320 is false, then the threshold amount of time has not been exceeded and the completion progress status currently presented via the user interface 200 is still sufficiently relevant so as not to need an estimate, so control returns to block 1305, as previously described above.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

What is claimed is:

1. A method comprising:
   weaving first advice to a plurality of join points in a test installer;
   executing the test installer, wherein the first advice, when executed at each of the join points in the test installer, saves times that the respective first advice executed;
   selecting a first subset of the join points that have time durations between the join points in the first subset that are within a threshold amount of time of being equal, wherein the selecting the first subset further comprises discarding, from the first subset, a join point whose time duration from adjacent join points is shortest until the time durations between the join points in the first subset are within the threshold amount of time of being equal, wherein the join point that is discarded defines a location in the test installer where the first advice executes within the test installer;

calculating a completion percentage for each of the join points in the first subset based on the times that the respective first advice executed;
executing a production installer; and
presenting completion progress status of the executing of the production installer based on the times for the join points in the first subset.

2. The method of claim 1, wherein the calculating further comprises:
calculating an elapsed time from a start of the executing to the time that each of the respective first advice was executed for each of the join points in the first subset;
determining a total time taken by the executing of the test installer; and
calculating the completion percentage that each of the elapsed times are of the total time.

3. The method of claim 2, further comprising:
calculating a sequence number of each of the join points, wherein the sequence number comprises a number of times that the first advice executed at the respective join point.

4. The method of claim 3, wherein the presenting further comprises:
presenting the completion progress status of the executing of the production installer based on the completion percentage and the sequence number for each of the join points in the first subset.

5. The method of claim 4, wherein the test installer comprises a plurality of methods, and wherein the join points are associated with the plurality of respective methods, and wherein the first advice, when executed at each of the join points in the test installer, saves identifiers of the respective join points.

6. The method of claim 5, wherein the production installer comprises the plurality of methods.

7. The method of claim 6, wherein the selecting the first subset further comprises:
selecting the first subset from among a plurality of subsets that are assigned to a plurality of installation options, wherein each of the plurality of installation options causes the executing the production installer to execute a different combination of the plurality of methods in the production installer, wherein a same join point identifier has different completion progress values while assigned to different of the plurality of installation options.

8. The method of claim 7, further comprising:
copying a specification of the first subset of the join points to a production install aspect, wherein the production install aspect comprises second advice; and
weaving the second advice to the first subset of the join points in the production installer, wherein the second advice, when executed at each of the join points in the production installer, sends an identifier of the respective join point to a status method.

9. A method for deploying computing services, comprising:
integrating computer readable code into a computer system, wherein the code in combination with the computer system performs the method of claim 1.

10. A non-transitory computer-readable storage medium encoded with instructions, wherein the instructions when executed comprise:
selecting a first profile from a plurality of profiles, wherein the first profile is assigned to an installation option, wherein the first profile comprises a specification of subset of a plurality of join points, a specification of a subset of a plurality of methods, a sequence number associated with each of the join points in the subset, and a completion progress percentage associated with each combination of the join point in the subset and the sequence number;
selecting the subset of the plurality of join points that have time durations between the join points in the subset that are within a threshold amount of time of being equal, wherein the selecting the subset further comprises discarding, from the subset, a join point whose time duration from adjacent join points is shortest until the time durations between the join points in the first subset are within the threshold amount of time of being equal;
copying a specification of the first subset of the join points to a production install aspect, wherein the production install aspect comprises advice;
weaving the advice to the subset of the join points in a production installer, wherein the join point that is discarded defines a location in the production installer where the advice executes within the production installer; and
calculating the completion progress percentage for each of the plurality of join points in the subset based on times that the advice executed.

11. The non-transitory computer-readable storage medium of claim 10, wherein the production installer comprises the plurality of methods.

12. The non-transitory computer-readable storage medium of claim 10, further comprising: executing the subset of the plurality of methods and the advice, wherein the advice, when executed at each of the join points in the production installer, sends an identifier of the respective join point to a status method.

13. The non-transitory computer-readable storage medium of claim 12, further comprising:
determining a number of times that the respective advice executed at the respective join point identified by the identifier;
finding the respective completion percentage with the respective sequence number that matches the number of times that the respective advice executed at the respective join point identified by the respective identifier; and
presenting the respective completion percentage.

14. The non-transitory computer-readable storage medium of claim 13, further comprising:
if an elapsed time threshold is exceeded since a most recent advice executed, estimating progress of the production installer since the most recent advice executed, and presenting the estimated progress.

15. A computer system comprising:
a processor; and
memory connected to the processor, wherein the memory encodes instructions that when executed by the processor comprise:
selecting a first profile from a plurality of profiles, wherein the first profile is assigned to an installation option, wherein the first profile comprises a specification of subset of a plurality of join points, a specification of a subset of a plurality of methods, a sequence number associated with each of the join points in the subset, and a completion progress percentage associated with each combination of the join point in the subset and the sequence number,
selecting the subset of the plurality of join points that have time durations between the join points in the subset that are within a threshold amount of time of being equal, wherein the selecting the subset further comprises discarding, from the subset, a join point whose time duration from adjacent join points is shortest until the time durations between the join points in the first subset are within the threshold amount of time of being equal, copying a specification of the first subset of the join points to a production install aspect, wherein the production install aspect comprises advice, weaving the advice to the subset of the join points in a production installer, wherein the join point that is discarded defines a location in the production installer where the advice executes within the production installer, and calculating the completion progress percentage for each of the plurality of join points in the subset based on times that the advice executed.

16. The computer system of claim 15, wherein the production installer comprises the plurality of methods.

17. The computer system of claim 15, wherein the instructions further comprise:

executing the subset of the plurality of methods and the advice, wherein the advice, when executed at each of the join points in the production installer, sends an identifier of the respective join point to a status method.

18. The computer system of claim 17, wherein the instructions further comprise:

determining a number of times that the respective advice executed at the respective join point identified by the identifier;

finding the respective completion percentage with the respective sequence number that matches the number of times that the respective advice executed at the respective join point identified by the respective identifier; and presenting the respective completion percentage.

19. The computer system of claim 18, wherein the instructions further comprise:

if an elapsed time threshold is exceeded since a most recent advice executed, estimating progress of the production installer since the most recent advice executed, and presenting the estimated progress.

* * * * *